United States Patent
Ohki

(10) Patent No.: US 10,451,860 B2
(45) Date of Patent: Oct. 22, 2019

(54) MICROSCOPE SYSTEM

(71) Applicant: NIKON CORPORATION, Minato-ku, Tokyo (JP)

(72) Inventor: Hiroshi Ohki, Yokohama (JP)

(73) Assignee: Nikon Corporation, Tokyo (JP)

( * ) Notice: Subject to any disclaimer, the term of this patent is extended or adjusted under 35 U.S.C. 154(b) by 163 days.

(21) Appl. No.: 15/296,442

(22) Filed: Oct. 18, 2016

(65) Prior Publication Data

US 2017/0102534 A1 Apr. 13, 2017

Related U.S. Application Data

(62) Division of application No. 13/276,698, filed on Oct. 19, 2011, now Pat. No. 9,507,138.

(Continued)

(30) Foreign Application Priority Data

Oct. 20, 2010 (JP) ................. 2010-235155

(51) Int. Cl.
  *G02B 21/08* (2006.01)
  *G02B 21/12* (2006.01)
  (Continued)

(52) U.S. Cl.
  CPC ......... *G02B 21/088* (2013.01); *G02B 21/086* (2013.01); *G02B 21/12* (2013.01);
  (Continued)

(58) Field of Classification Search
  CPC .. G02B 21/00; G02B 21/0004; G02B 21/002; G02B 21/0024; G02B 21/0032;
  (Continued)

(56) References Cited

U.S. PATENT DOCUMENTS 4,067,938 A 1/1978 Jack
4,561,731 A 12/1985 Kley
(Continued)

FOREIGN PATENT DOCUMENTS

JP 06-003599 A 1/1994
JP 08-220568 A 8/1996
(Continued)

OTHER PUBLICATIONS

Office Action (Communication pursuant to Article 94(3) EPC) dated Jul. 24, 2018, in European Patent Application No. 11785141.0.
(Continued)

*Primary Examiner* — Robert E. Tallman
(74) *Attorney, Agent, or Firm* — Shapiro, Gabor and Rosenberger, PLLC

(57) ABSTRACT

A microscope system as an optical microscope system for observing a specimen includes: an imaging optical system that forms an image of transmitted light or reflected light from the specimen; an illumination light source that illuminates illumination light on the specimen; an illumination optical system that has a first spatial light modulation element, which changes intensity distribution of the illumination light at a conjugate position of a pupil of the imaging optical system, and illuminates light, which is originated from the illumination light source, on the specimen; an image sensor that detects light through the imaging optical system; and a calculation section that calculates the intensity distribution of the illumination light appropriate for observation of the specimen on the basis of the intensity distribution of the illumination light formed by the first spatial light modulation element and output data detected by the image sensor.

7 Claims, 19 Drawing Sheets

Related U.S. Application Data

(60) Provisional application No. 61/534,197, filed on Sep. 13, 2011.

(51) Int. Cl.
*G02B 21/14* (2006.01)
*G02B 21/26* (2006.01)
*G02B 21/36* (2006.01)
*G02F 1/1335* (2006.01)
*G02F 1/137* (2006.01)

(52) U.S. Cl.
CPC .............. *G02B 21/14* (2013.01); *G02B 21/26* (2013.01); *G02B 21/361* (2013.01); *G02B 21/368* (2013.01); *G02F 1/137* (2013.01); *G02F 1/133528* (2013.01); *G02F 2203/12* (2013.01)

(58) Field of Classification Search
CPC ............ G02B 21/0056; G02B 21/0068; G02B 21/008; G02B 21/06; G02B 21/1012; G02B 21/12514
USPC ......... 359/368–371, 379–383, 385–387, 389
See application file for complete search history.

(56) References Cited

U.S. PATENT DOCUMENTS

| | | | |
|---|---|---|---|
| 4,873,653 | A | 10/1989 | Grosskopf |
| 6,243,197 | B1 | 6/2001 | Schalz |
| 6,839,166 | B2 | 1/2005 | Fukushima et al. |
| 6,924,893 | B2 | 8/2005 | Oldenbourg et al. |
| 7,564,622 | B2 * | 7/2009 | Ishiwata ................ G02B 21/14 359/368 |
| 9,250,432 | B2 | 2/2016 | Weiss et al. |
| 2003/0015643 | A1 | 1/2003 | Veith et al. |
| 2003/0030902 | A1 * | 2/2003 | Fukushima .......... G02B 21/086 359/388 |
| 2003/0183775 | A1 | 10/2003 | Mutou |
| 2004/0047033 | A1 * | 3/2004 | Nakagawa ........... G02B 21/367 359/368 |
| 2004/0061914 | A1 | 4/2004 | Miyawaki et al. |
| 2005/0190437 | A1 | 9/2005 | Nakagawa |
| 2007/0211243 | A1 | 9/2007 | Laroche et al. |
| 2008/0259345 | A1 | 10/2008 | Fukutake |
| 2011/0013136 | A1 | 1/2011 | Archambeau et al. |
| 2011/0109961 | A1 | 5/2011 | Hayashi et al. |
| 2012/0086795 | A1 | 4/2012 | Weiss et al. |
| 2012/0099172 | A1 | 4/2012 | Ohki |

FOREIGN PATENT DOCUMENTS

| | | |
|---|---|---|
| JP | 08-327324 A | 12/1996 |
| JP | 2000-502472 A | 2/2000 |
| JP | 2003-121749 A | 4/2003 |
| JP | 2004-101871 A | 4/2004 |
| JP | 2005-292538 A | 10/2005 |
| JP | 2009-237109 A | 10/2009 |
| JP | 2010-507119 T | 3/2010 |
| JP | 2012-083755 A | 4/2012 |
| JP | 2012-088530 A | 5/2012 |
| WO | WO 2008/046858 A1 | 4/2008 |
| WO | WO 2008/123408 A1 | 10/2008 |

OTHER PUBLICATIONS

Office Action dated Jul. 19, 2017, in Japanese Patent Application No. 2016-140165.
Notice of Allowance dated Jul. 18, 2016, in U.S. Appl. No. 13/276,698.
Notice of Allowance dated Apr. 11, 2016, in U.S. Appl. No. 13/276,698.
Notice of Allowance dated Jan. 6, 2016, in U.S. Appl. No. 13/276,698.
Non-Final Office Action dated Jun. 19, 2015, in U.S. Appl. No. 13/276,698.
Final Office Action dated Oct. 6, 2014, in U.S. Appl. No. 13/276,698.
Non-Final Office Action dated Jun. 20, 2014, in U.S. Appl. No. 13/276,698.
Final Office Action dated Jul. 9, 2013, in U.S. Appl. No. 13/276,698.
Non-Final Office Action dated Feb. 1, 2013, in U.S. Appl. No. 13/276,698.
Notice of Allowance dated Oct. 5, 2016, in U.S. Appl. No. 13/362,642.
Non-Final Office Action dated May 19, 2016, in U.S. Appl. No. 13/362,642.
Final Office Action dated Nov. 5, 2015, in U.S. Appl. No. 13/362,642.
Non-Final Office Action dated Apr. 30, 2015, in U.S. Appl. No. 13/362,642.
Final Office Action dated Dec. 17, 2014, in U.S. Appl. No. 13/362,642.
Non-Final Office Action dated Jul. 17, 2014, in U.S. Appl. No. 13/362,642.
Office Action dated Apr. 22, 2016, in Taiwanese Patent Application No. 100137820.
Office Action dated Apr. 4, 2016, in Japanese Patent Application No. 2015-070899.
Office Action dated Dec. 21, 2015, in Taiwanese Patent Application No. 101106455.
Office Action dated Aug. 27, 2015, in Chinese Patent Application No. 201280017713.8.
Office Action dated Jul. 23, 2015, in Taiwanese Patent Application No. 100137820.
Office Action dated Jan. 23, 2015, in Chinese Patent Application No. 201280017713.8.
Office Action dated Nov. 3, 2014, in Chinese Patent Application No. 201180050056.2.
Office Action dated Sep. 22, 2014, in Japanese Patent Application No. 2010-235155.
International Search Report for International Patent Application No. PCT/JP2012/052569, dated May 30, 2012.
Written Opinion of the International Searching Authority for International Patent Application No. PCT/JP2012/052569, dated May 30, 2012.
International Search Report for International Patent Application No. PCT/JP2011/074597, dated Apr. 16, 2012.
Written Opinion of the International Searching Authority for International Patent Application No. PCT/JP2011/074597, dated Apr. 16, 2012.
Invitation to Pay Additional Fees with Partial International Search Report dated Dec. 29, 2011, in International Patent Application No. PCT/JP2011/074597.
Office Action dated Sep. 19, 2018, in Chinese Patent Application No. 201710111862.5.
J.-M. Renders et al., "Hybridizing genetic algorithms with hill-climbing methods for global optimization: two possible ways", Proceedings of the First IEEE Conference on Evolutionary Computation, IEEE World Congress on Computational Intelligence, Orlando, FL, USA Jun. 27-29, 1994, Jan. 1, 1994, pp. 312-317.
Holland et al., "When Will a Genetic Algorithm Outperform Hill-Climbing?", Jun. 1, 1993.
Office Action issued Feb. 4, 2019, in European Patent Application No. 11785141.0.
Office Action issued Apr. 11, 2019, in Chinese Patent Application No. 201710111862.5.

* cited by examiner

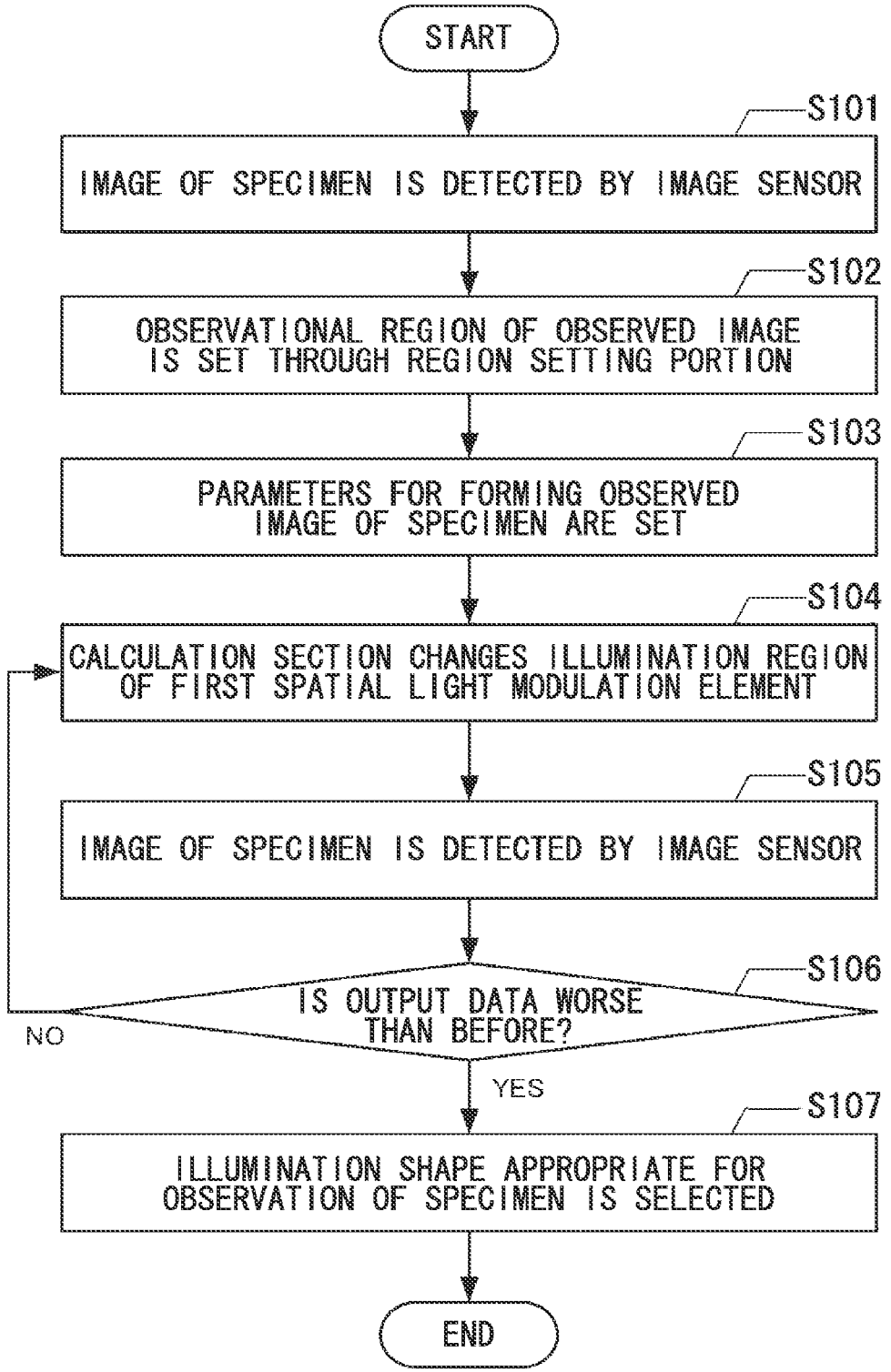

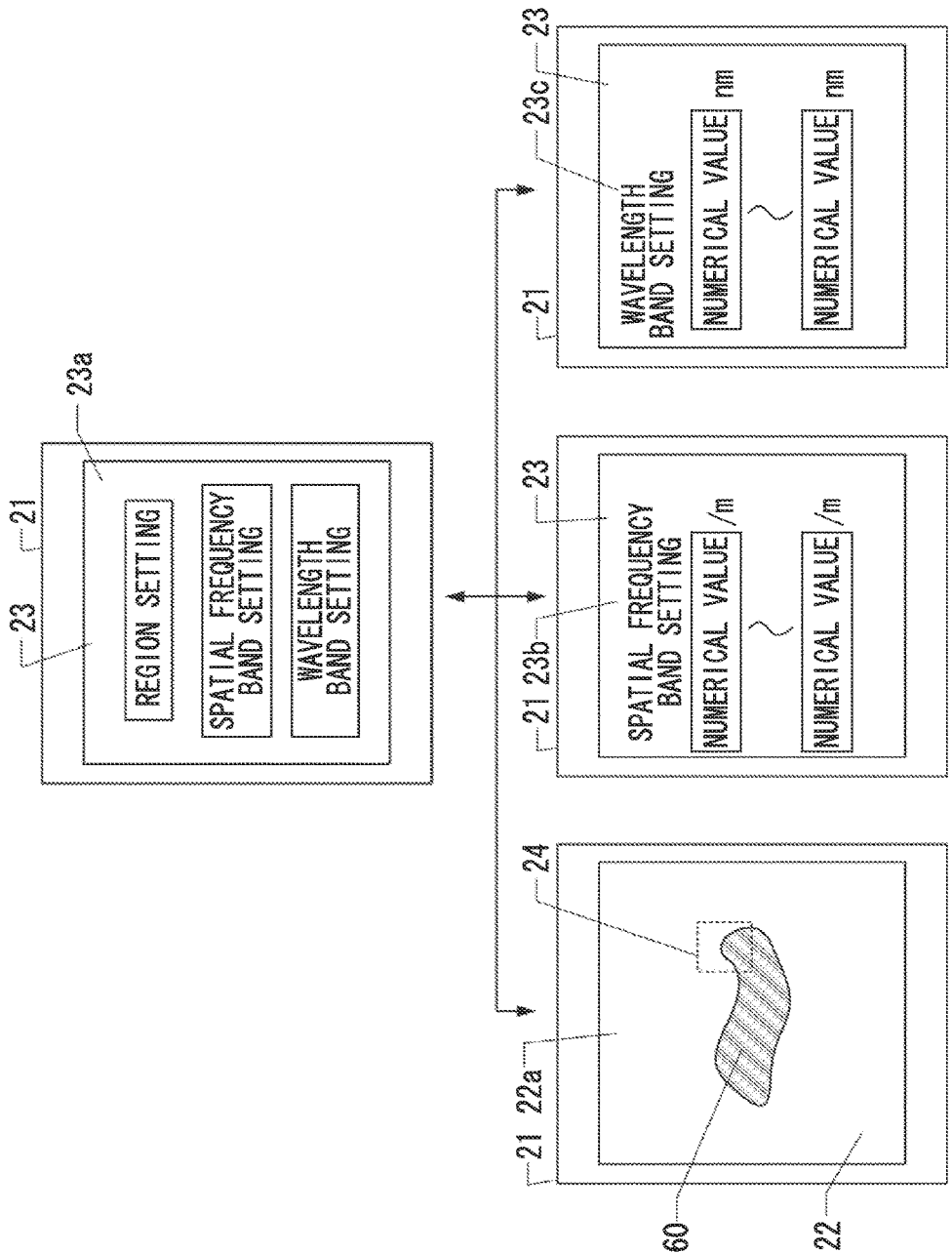

MICROSCOPE SYSTEM

CROSS-REFERENCE TO RELATED APPLICATION

This application is a non-provisional application claiming priority to and the benefit of U.S. provisional application No. 61/534,197, filed on Sep. 13, 2011, and claims priority to Japanese Patent Application No. 2010-235155, filed on Oct. 20, 2010. The entire contents of which are incorporated herein by reference.

BACKGROUND

Field of the Invention

The present invention relates to a microscope system that derives and forms intensity distribution of illumination light appropriate for observation.

Description of Related Art

In bright field microscopes, the intensity distribution of the illumination light is adjusted by changing a diaphragm having a circular shape. Furthermore, the shape of the diaphragm may be selected and applied on the basis of determination of an observer. In phase-contrast microscopes, a ring diaphragm and a phase ring form the intensity distribution of the illumination light.

Since the intensity distribution of the illumination light has a great effect on an observational image of a specimen, a circular diaphragm, a ring diaphragm and a phase ring, or the like have been subjected to tests to further improve the observation picture of the specimen. For example, in Japanese Unexamined Patent Application Publication No. 2009-237109, a modulation section is provided to surround a ring region which is formed in a ring shape of the phase ring, and is formed such that the direction of the transmission axis of the modulation section is different from that of a region other than the modulation section, thereby embodying a phase-contrast microscope capable of continuously changing the contrast.

SUMMARY

However, in the above-mentioned microscopes, the shape of the diaphragm is fixed to some extent, and there is a limitation in adjustment of the intensity distribution of the illumination light. Furthermore, even in a case of selecting the shape of the diaphragm, the selection is performed on the basis of determination or experience of the observer, and thus the shape of the diaphragm is not always formed to be able to observe the image of the object at its best condition during observation. Furthermore, in the phase-contrast microscopes, the positions of the ring diaphragm and the phase ring are fixed, and thus it is difficult to freely select the shape and observe the image of the object at its best condition during the observation.

Accordingly, the present invention provides a microscope system that derives and forms the intensity distribution of the illumination light appropriate to observe the specimen.

According to a first aspect, a microscope system as an optical microscope system for observing a specimen includes: an imaging optical system that forms an image of transmitted light or reflected light from the specimen; an illumination light source that illuminates illumination light to the specimen; an illumination optical system that has a first spatial light modulation element, which changes the intensity distribution of the illumination light at a conjugate position of a pupil of the imaging optical system, and illuminates light, which is originated from the illumination light source, on the specimen; an image sensor that detects light through the imaging optical system; and a calculation section that calculates the intensity distribution of the illumination light appropriate for observation of the specimen on the basis of the intensity distribution of the illumination light formed by the first spatial light modulation element and output data detected by the image sensor.

According to the present invention, there is provided a microscope system that derives and forms the intensity distribution of the illumination light appropriate to observe an image of an object in good condition during the observation.

BRIEF DESCRIPTION OF THE DRAWINGS

FIG. 3 is a flowchart of the hill climbing method that finds an appropriate illumination region 91.

FIG. 4A is a diagram of a region setting portion 22 and a parameter setting portion 23 of a display section 21.

DESCRIPTION OF EMBODIMENTS

First Example

As a first example, a description will be given of a microscope system 100 which is automatically adjusted by deriving the intensity distribution of the illumination light appropriate to observe the image of the object in a better condition during the observation by freely changing the shape of the diaphragm.

<Microscope System 100>

Figure 1:
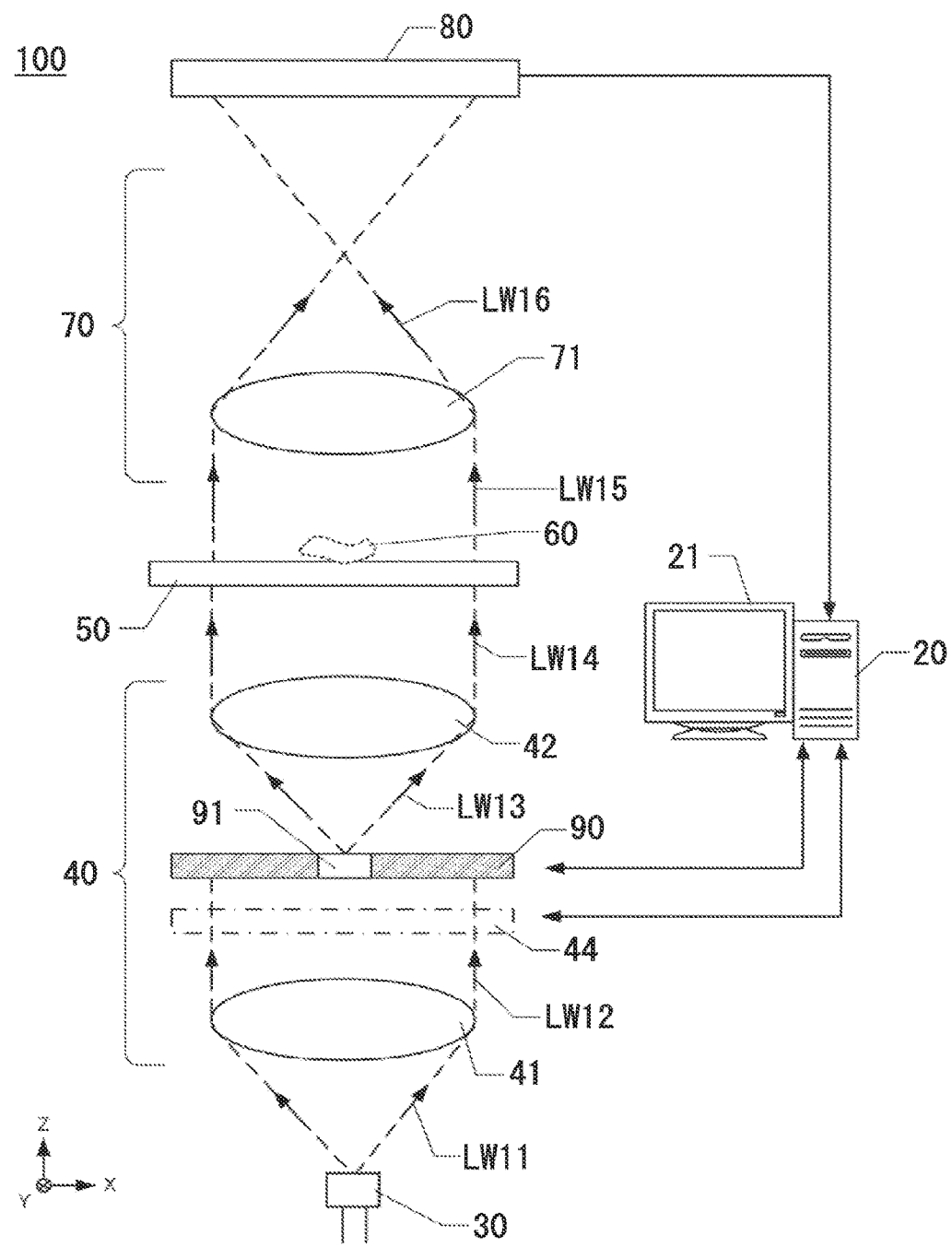
FIG. 1 is a schematic configuration diagram of a microscope system 100.

FIG. 1 is a schematic configuration diagram of the microscope system 100. The microscope system 100 mainly includes: an illumination light source 30; an illumination optical system 40; a stage 50; an imaging optical system 70; an image sensor 80; and a calculation section 20. Hereinafter, the center axis of rays emitted from the illumination light source 30 is set as the Z axis direction, and the directions, which are perpendicular to the Z axis and are orthogonal to each other, are set as the X axis direction and the Y axis direction.

The illumination light source 30 illuminates white illumination light on, for example, the specimen 60. The illumination optical system 40 includes a first condenser lens 41, a wavelength filter 44, a first spatial light modulation element 90, and a second condenser lens 42. Furthermore, the imaging optical system 70 includes an objective lens 71. The stage 50 is movable in the XY axis directions in a state where the specimen 60 having an unknown structure of, for example, cell tissues or the like is placed. Furthermore, the imaging optical system 70 forms an image of the transmitted light or the reflected light of the specimen 60 on the image sensor 80.

The first spatial light modulation element 90 of the illumination optical system 40 is disposed, for example, at a position conjugate to the position of the pupil of the imaging optical system 70 in the illumination optical system 40, and is able to change the intensity distribution of the illumination light at the conjugate position of the pupil of the imaging optical system 70. Furthermore, the first spatial light modulation element 90 has an illumination region 91 of which the shape and the size are freely changeable, and is able to arbitrarily change the intensity distribution of the illumination light by changing the size or the shape of the illumination region 91. Furthermore, a wavelength filter 44 limits the wavelength of the transmitted rays within a specific range. As the wavelength filter 44, for example, a bandpass filter for transmitting only light with the wavelength in the specific range is used. The wavelength filter 44 is removable, and is replaced by providing a bandpass filter for transmitting a plurality of rays with respective different wavelengths. Thereby, it is possible to control the wavelength of the light transmitted through the wavelength filter 44.

The calculation section 20 receives the output data which is detected by the image sensor 80, and displays the output data on the display section 21 such as a monitor. Furthermore, by analyzing the output data, the intensity distribution of the illumination light appropriate for the observation of the specimen 60 is calculated. Furthermore, the calculation section 20 is able to perform control of the wavelength range of the rays, which are transmitted through the wavelength filter 44, such as control and drive of the illumination region 91 of the first spatial light modulation element 90.

In FIG. 1, the light, which is emitted from the illumination light source 30, is indicated by the dotted line. The light LW11, which is emitted from the illumination light source 30, is converted into the parallel light LW12 through the first condenser lens 41. The light LW12 is transmitted through the wavelength filter 44 such that the wavelength range of the light LW12 is specified, and is incident to the first spatial light modulation element 90. The light LW13, which passes through the illumination region 91 of the first spatial light modulation element 90, is transmitted through the second condenser lens 42, is converted into the light LW14, and propagates toward the stage 50. The light LW15, which is transmitted through the stage 50, is transmitted through the imaging optical system 70, is converted into the light LW16, and forms an image of the specimen 60 on the image sensor 80.

The image of the specimen 60 detected by the image sensor 80 is sent as the output data to the calculation section 20. The calculation section 20 estimates the structure of the specimen 60 on the basis of output data which can be obtained from the image sensor 80, a transmission wavelength of the wavelength filter 44, and shape data of the illumination region 91 which is formed by the first spatial light modulation element 90, thereby calculating the illumination shape appropriate for the observation of the specimen 60, that is, the intensity distribution of the illumination light. Then, the shape, which is appropriate for the observation of the specimen 60 subjected to the calculation, is transmitted to the first spatial light modulation element 90, and the illumination region 91 is formed in an illumination shape which is appropriate for the observation of the specimen 60. Furthermore, likewise, the wavelength of the illumination light, which is appropriate for the observation of the specimen 60, is also calculated by the calculation section 20, and a bandpass filter most appropriate for the observation of the specimen 60 is selected as the wavelength filter 44.

<Illumination Optical System 40>

As the first spatial light modulation element 90, a liquid crystal panel 93, a digital micro mirror device (DMD) 94, and the like may be used. The first spatial light modulation element 90 in a case of using the above-mentioned components will be described with reference to FIG. 2.

Figure 2A:
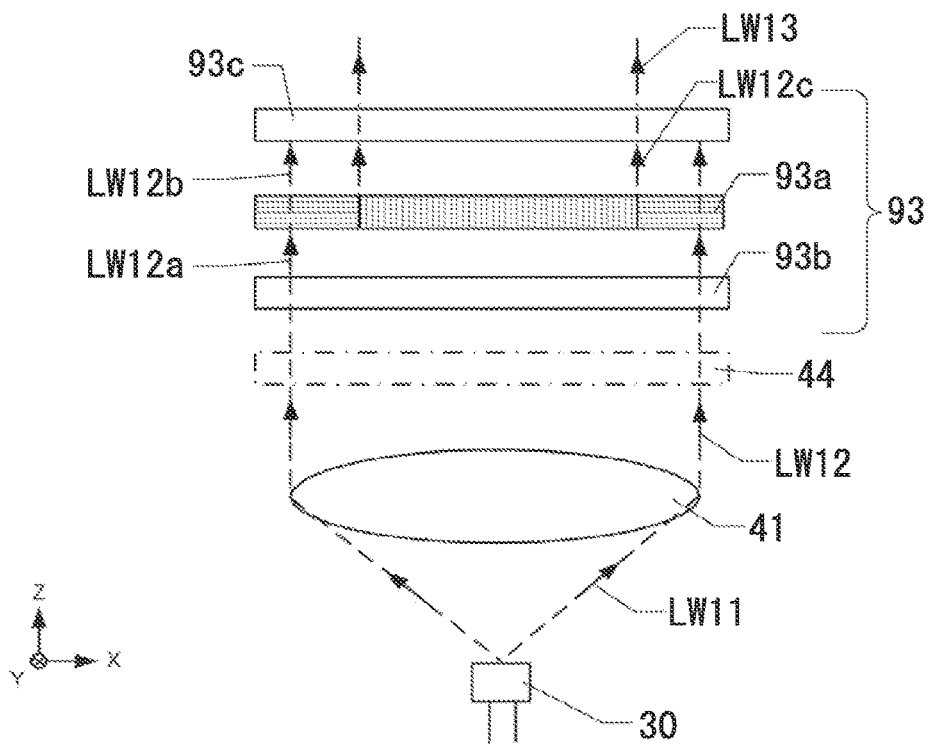
FIG. 2A is a schematic configuration diagram in a case where a first spatial light modulation element 90 is a liquid crystal panel 93.

FIG. 2A is a schematic configuration diagram in a case where a first spatial light modulation element 90 is the liquid crystal panel 93. The liquid crystal panel 93 is constituted by, for example, a liquid crystal film 93a, a first polarizing film 93b, and a second polarizing film 93c. The liquid crystal film 93a is filled with a liquid crystal material, and electrodes such as thin film transistors (TFT) are formed thereon, whereby it is possible to apply a voltage to any locations of the liquid crystal film 93a. The light LW11, which is emitted from the illumination light source 30, is converted into the parallel light LW12 through the first condenser lens 41, and the range of the wavelength thereof is specified by the wavelength filter 44, whereby the light is limited to only the light LW12a which is unidirectionally polarized by the first polarizing film 93b. The light LW12a is converted into the light LW12c, which is polarized at 90 degrees by applying a voltage to the liquid crystal film 93a, and the light LW12b, which is not polarized by not applying a voltage to the liquid crystal film 93a, through the liquid crystal film 93a. The second polarizing film 93c is disposed to transmit only light, which is polarized at 90 degrees, among light which is transmitted through the first polarizing film 93b. Hence, only the light LW12c is transmitted through the second polarizing film 93c, and the light LW13 is transmitted through the second polarizing film 93c. In the liquid crystal panel 93, the illumination region 91 is formed in a random shape by controlling the position of the liquid crystal film 93a where a voltage is applied.

Figure 2B:
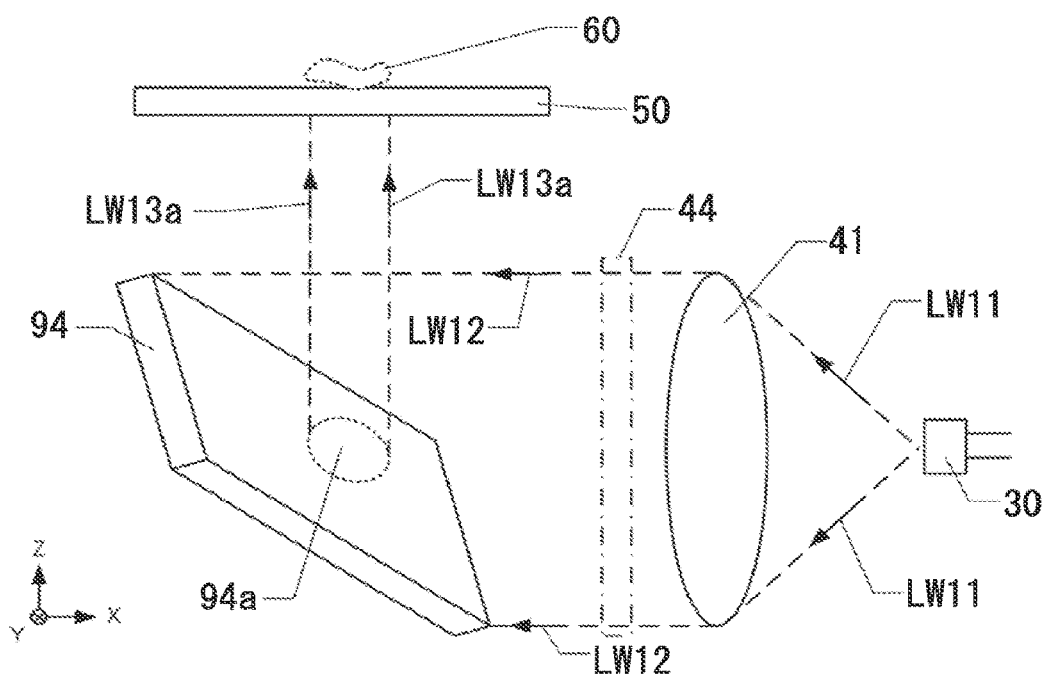
FIG. 2B is a schematic configuration diagram in a case where the first spatial light modulation element 90 is a digital micro mirror device (DMD) 94.

FIG. 2B is a schematic configuration diagram in a case where the first spatial light modulation element 90 is the digital micro mirror device (DMD) 94. The aggregation of a plurality of small movable reflection mirrors (not shown in the drawing) is formed on the surface of the DMD 94, and each mirror is independently movable. The light LW11, which is emitted from the illumination light source 30, is converted into the parallel light LW12 through the first condenser lens 41, and the range of the wavelength thereof is specified by the wavelength filter 44, whereby the light is illuminated on the entire DMD 94. When the movable reflection mirrors which are disposed in the region 94a of the DMD 94 are directed to a direction in which the light LW11 is reflected by the specimen 60, the light LW13a is illuminated on the specimen 60. When the DMD 94 is used in the first spatial light modulation element 90, by performing control as to which positions the movable reflection mirror moves, it is possible to illuminate the light with a random shape to the specimen 60. This means that the illumination region 91 of the first spatial light modulation element 90 shown in FIG. 1 is formed in the random shape.

As the first spatial light modulation element 90, an electrochromic element may be used. The electrochromic element is mainly formed in a structure in which the transparent electrodes such as TFTs and the electrochromic layer are combined and laminated. In the electrochromic layer, when a voltage is applied, an electrolytic oxidation or reduction reaction reversibly occurs in the region to which the voltage is applied. Thus, it is possible to reversibly change a state in which the light is transmitted, and a state in which the light is not transmitted. Hence, in the electrochromic element, the illumination region 91 is formed in a random shape by controlling the position of the electrochromic layer where a voltage is applied. The detailed description of the operation and the structure of the electrochromic element are disclosed in, for example, Japanese Unexamined Patent Application Publication No. H8-220568.

Furthermore, as the first spatial light modulation element 90, an optical element may be used if the optical element has a plurality of spaces in which an electroactive material having the specific optical characteristics such as the transmittance changed by application of an electric stimulus is enclosed and in which electrodes such as TFTs are formed. The optical element has cells which are airtightly sealed and are formed in an array shape, and the electroactive material is sealed in each cell. The electrodes are formed in the respective cells, and a voltage can be independently applied to each cell. Thus, by controlling the voltage applied to the cell, it is possible to reversibly change a state in which light is transmitted through the cell and a state in which light is not transmitted through the cell. In this optical element, by performing control as to which cells a voltage is applied to, the illumination region 91 is formed in a random shape. The detailed description of the operation and the structure of this optical element are disclosed in, for example, PCT Japanese Translation Patent Publication No. 2010-507119.

In FIG. 1, the wavelength filter 44 is disposed between the first condenser lens 41 and the first spatial light modulation element 90, but in order to detect the light with a specific wavelength through the image sensor 80, the filter may be disposed at a certain position between the illumination light source 30 and the image sensor 80.

Furthermore, instead of using a light source which illuminates white illumination light as the illumination light source 30 and the wavelength filter 44, an LED (light emitting diode) or the like may be used as the illumination light source 30. When the illumination light source 30 is constituted by the LED, for example, the illumination light source can be constituted by combination of the LEDs emitting light with respective wavelengths of red, blue, and green. Light on/off of the LED with each wavelength is controlled by the calculation section 20, thereby controlling the wavelength of the light which is emitted by the illumination light source 30. In such a manner, the LED light source can be used instead of the combination of the wavelength filter 44 and the white illumination light source. Furthermore, as the image sensor 80, an image pickup device having a plurality of light receiving elements, in which the wavelengths of the received light are different, such as CCD and CMOS may be used. In this case, for example, by extracting a signal of the light receiving element which receives light with the wavelength of red, it is possible to obtain the light with the wavelength of red transmitted through the specimen 60.

<<Method of Deriving Illumination Shape (Intensity Distribution of the Illumination Light)>>

A method of calculating an illumination shape appropriate for the observation of the specimen 60 will be hereinafter described. As the calculation method, there are several methods such as simulated annealing and Tabu search. Hereinafter, two methods of the hill climbing method (the maximum grade method) and a method using the genetic algorithm will be described.

<Hill Climbing Method>

The hill climbing method is a method of incrementally changing the initially set illumination shape and acquiring output data of a picture for each change so as to thereby find a condition in which the output data is most approximate to the condition set by an observer. Referring to FIG. 3, the description will be given below.

FIG. 3 is a flowchart of the hill climbing method that finds an appropriate illumination shape by incrementally changing the illumination shape.

In step S101, first, the illumination region 91 of the first spatial light modulation element 90 is set to the size and shape of an initial setting. For example, the illumination region 91 of the initial setting has a circular shape of which the diameter is the maximum. In this state, the image of the specimen 60 is detected by the image sensor 80. It is an object of the detection of the image of the specimen 60 to acquire a reference picture before adjusting the shape and size of the illumination region 91. The output data of the picture of the image of the specimen 60 detected by the image sensor 80 is sent to the calculation section 20, and then the picture of the specimen 60 is displayed on the display section 21 such as a monitor which is connected to the calculation section 20.

In step S102, a region setting portion 22 (refer to FIG. 4A) on the display section 21 sets an observational region 24 (refer to FIG. 4A) of the observed image. In step S101, the picture of the specimen 60 is displayed in the region setting portion 22. The region setting portion 22 and the observational region 24 will be described in detail with reference to FIG. 4A.

In step S103, parameters for forming the observed image of the specimen 60 are set. In the parameter setting portion 23 (refer to FIG. 4A), the observer is able to set parameters for inputting the observation condition, which is requested and allowed by an observer, for the observed image of the specimen 60. Hereinafter, referring to FIG. 4A, a display example of the display section 21 will be described.

FIG. 4A is a diagram of the region setting portion 22 and the parameter setting portion 23 of the display section 21. It is preferable that the display section 21 be formed by GUI (graphical user interface) which performs an input through a mouse, a touch pad, and the like. Since the observer is able to intuitively perform operation through the GUI, the GUI facilitates the operation. The display section 21 may display, for example, the region setting portion 22 and the parameter setting portion 23. The image of the specimen 60 is displayed in the region setting portion 22, and thus it is possible to set the observational region desired by the observer. Furthermore, in the parameter setting portion 23, it is possible to input the setting of the observation condition desired by the observer. For example, an observation condition setting item display screen 23a is displayed in the parameter setting portion 23. In the observation condition setting item display screen 23a, for example, items such as region setting, spatial frequency band setting, and wavelength band setting are displayed. When the region setting is selected, the screen of the display section 21 is changed into the region setting screen 22a. Furthermore, when the spatial frequency band setting and the wavelength band setting are selected, the screen of the display section 21 is respectively changed into the spatial frequency band setting screen 23b and the wavelength band setting screen 23c.

The region setting portion 22 is represented as, for example, the region setting screen 22a. In the region setting portion 22, the picture of the specimen 60 detected in step S101 is displayed. The observer is able to set the observational region 24 for the observed image of the specimen 60. For example, the observer may set the entirety of the specimen 60 as the observational region 24, or may set only a part of the specimen 60. Furthermore, in the region setting portion 22, two or more observational regions 24 may be set at a time. Furthermore, the region setting portion 22 may display the specimen 60 by non-optically and electrically enlarging it such that the observer easily sets the observational region 24, or may display the entire image of the specimen 60 by reducing the picture of the specimen 60. Furthermore, the observational region 24 is set as a region in which the parameters set by the parameter setting portion 23 are reflected.

Furthermore, the observational region 24 may be automatically set by the calculation section 20. For example, the contrast of the picture output data acquired in step S101 is calculated, and the region is roughly classified into a high contrast region and a low contrast region. Then, the low contrast region in the region setting screen 22a of FIG. 4A is automatically set as the observational region 24, and thus it is possible to optimize this observation condition in the observational region 24. In this example, the region is roughly classified into the high contrast region and the low contrast region, but the invention is not limited to the two regions. For example, the region may be classified into three or more regions including a mid contrast region by timely setting of a threshold value of the contrast. Furthermore, in this example, the low contrast region is set as the observational region 24, but instead of this, the high contrast region or the mid contrast region may be set. Furthermore, the setting of the observational region 24 is not limited to the methods based on contrast. For example, on the basis of the spatial frequency and the like derived by a method of detecting the spatial frequency information of an object described below, the observational region 24 may be automatically set.

In the spatial frequency band setting screen 23b, the observer is able to set the desired spatial frequency band of the specimen 60. The setting of the spatial frequency band may be, as shown in FIG. 4A, made in such a way that the observer inputs numerical values, or may be made such that the observer is able to select the desired spatial frequency band among a plurality of options. Furthermore, in the wavelength band setting screen 23c, the observer is able to set the wavelength band of the light which is intended to be used or intended to be observed. For example, when the wavelength appropriate for the observation of the specimen 60 is estimated in method 1 of estimating the object information to be described later, the wavelength can be set by the wavelength band setting screen 23c. The setting of the wavelength band may be made, as shown in FIG. 4A, in such a way that the observer inputs numerical values, or may be made such that the observer is able to select the desired wavelength band among a plurality of options of, for example, red, green, and blue.

In addition, when the observer does not want to set the observational region 24, step S102 may be skipped. In this case, the entire image of the specimen 60 detected by the image sensor 80 is set as the observational region 24.

As shown in FIG. 4A, the observer sets the parameters by using the parameter setting portion 23 of the display section 21 at the condition which is requested or allowed by the observer. The examples of the set parameters include a specific location of the specimen 60 which is intended to be observed at a high contrast, a specific spatial frequency region of the specimen 60, and the like. For example, there may be a request to observe the observational region 24, which is set in step S102, by giving a shading effect thereto or to clearly observe the detailed image of the observational region 24. In this case, the observer is able to set the wavelength band and the spatial frequency band.

Figure 4B:
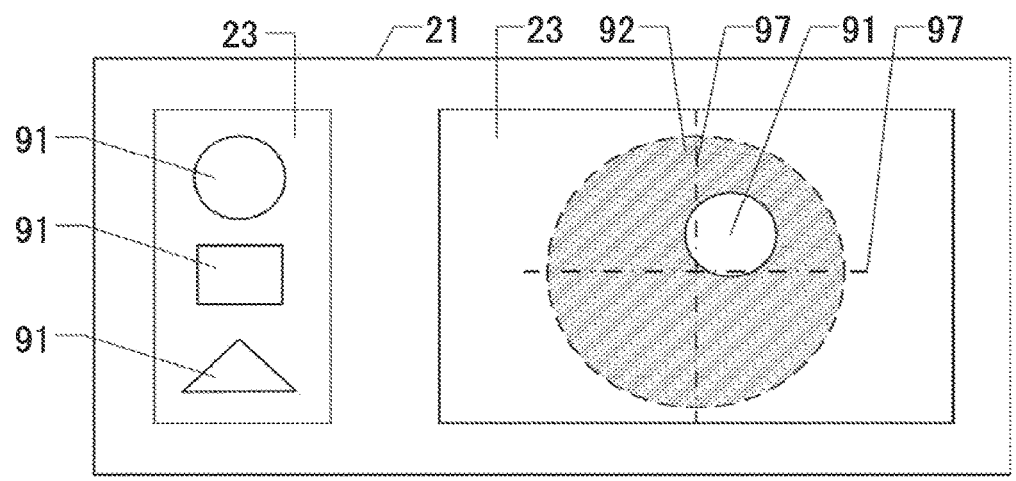
FIG. 4B is a diagram of the display section 21 in a case of setting the illumination region 91 of the first spatial light modulation element 90.

Furthermore, the observer may initialize the illumination region 91 as a single parameter. For example, it is possible to initialize the shape of the illumination region 91 which is used first in step S104 to be described later. Furthermore, in step S101, in such a case where the shape of the illumination region 91 preferred for the specimen 60 can be anticipated, the shape of the illumination region 91 may be used as an initial setting. By initializing the shape of the illumination region 91, it is possible to reduce the time to finally determine the shape of the illumination region 91. Referring to FIG. 4B, a description will be given of an example in the case where the observer initializes the illumination region 91.

FIG. 4B is a diagram of the display section 21 in the case of initializing the illumination region 91 of the first spatial light modulation element 90. In FIG. 4B, the parameter setting portions 23 are formed at two locations on the right and left sides of the display section 21. In the right-side parameter setting portion 23, the top plan view of the first spatial light modulation element 90 is indicated by the dotted line. Furthermore, in FIG. 4B, a light blocking section 92 and the illumination region 91 which is formed in the light blocking section 92 are indicated by the hatched line. Furthermore, in FIG. 4B, the coordinate lines 97 are represented such that the center axis of the first spatial light modulation element 90 is recognizable. The observer is able to freely initialize the shape of the illumination region 91 of the first spatial light modulation element 90. In order to form the illumination region 91, for example, the shape samples of the illumination region 91 may be displayed in the left-side parameter setting portion 23 of FIG. 4B, and a desired illumination region 91 may be selected therefrom. In addition, the desired illumination region 91 may be formed by freely drawing the shape thereof. Furthermore, it is not necessary for the illumination region 91 to be disposed on the center axis of the first spatial light modulation element 90. That is, the observer may set, as shown in FIG. 4B, the illumination region 91 at a position far from the center axis. Furthermore, two or more illumination regions 91 may be set at the same time.

The screen shown in FIG. 4A or 4B is selectively displayed as a window on the display section 21. Furthermore, the display section 21 may display only the region setting portion 22 or the parameter setting portion 23.

Returning to FIG. 3, in step S104, the calculation section 20 changes the size of the illumination region 91 of the first spatial light modulation element 90. When the observer sets the illumination region 91 in step S103, the calculation section 20 uses the set illumination region 91 as the initial setting value, and changes the size of the illumination region 91. When the illumination region 91 is not set in step S103, the calculation section 20 slightly changes the size of the illumination region 91 of the initial setting value which is set in step S101. That is, the intensity distribution of the illumination light is slightly changed.

Figure 5:
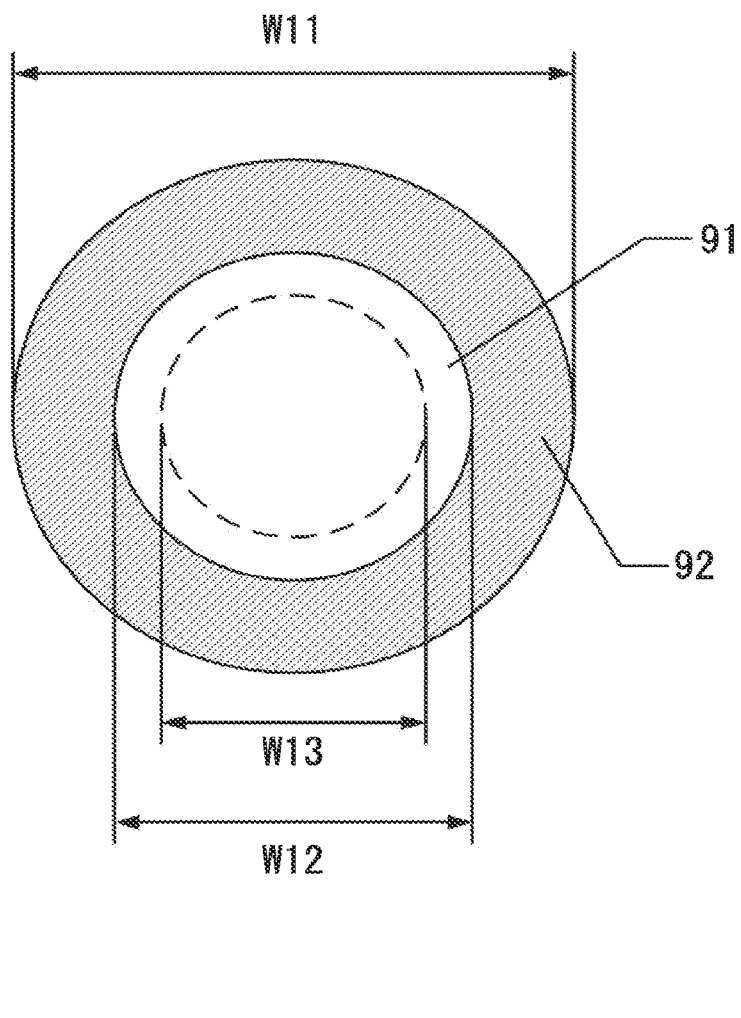
FIG. 5 is a schematic top plan view of the illumination region 91 which is formed by the first spatial light modulation element 90.

Referring to FIG. 5, the change of the intensity distribution of the illumination light will be described. FIG. 5 is a schematic top plan view of the first spatial light modulation element 90. In FIG. 5, the circular illumination region 91 is formed on the center portion of the light blocking section 92 of the first spatial light modulation element 90. FIG. 5 shows an example in the case where the illumination region 91 is initialized as a circle of which the diameter is W13 at the center of the first spatial light modulation element 90 in step S103.

The diameter of the light blocking section 92 is W11, and the diameter of the illumination region 91 of the initial setting is W13. Then, the size of the illumination region 91 is slightly changed in step S104, and the diameter of the illumination region 91 is changed to W12. In the example of FIG. 5, the calculation section 20 changes the diameter of the illumination region 91 from the diameter W13 to the diameter W12 which is slightly larger than W13, where the change is performed such that the intensity distributions of the illumination light thereof are similar to each other.

In step S105, the image sensor 80 detects the image of the specimen 60. For example, in FIG. 5, under the condition of the illumination region 91 of which the diameter is changed to the diameter W12, the image of the specimen 60 is detected by the image sensor 80, and the output data is sent to the calculation section 20.

In step S106, it is determined whether or not the current output data, which is sent to the calculation section 20, is worse than the previous output data. For example, the observational region 24 is set by the region setting portion 22 of the display section 21 shown in FIG. 4A, and it is assumed that the setting where the contrast of the observational region 24 is intended to increase is performed by the parameter setting portion 23. A comparison is performed as to whether or not the contrast, which is calculated on the basis of the currently obtained output data (for example, when the illumination region 91 has the diameter W12), is worse than the contrast which is calculated on the basis of the previously obtained output data (for example, when the illumination region 91 has the diameter W13). If it is not worse, the procedure returns to step S104, the diameter of the illumination region 91 is changed, and the output data is detected (step S105). That is, since the contrast of the observational region 24 increases, the procedure returns to step S104, and the size of the illumination region 91 is further changed. In contrast, if the current contrast is worse than the previous contrast, the diameter of the previous illumination region 91 has the maximum contrast. Accordingly, the procedure advances to the next step S107.

In step S107, the illumination shape, which is appropriate for the observation of the specimen 60, is selected. That is, the illumination shape, which is used just before the contrast of the observational region 24 gets worse, is assumed as an illumination shape for the observation of the specimen 60, and is used in the observation of the specimen 60.

In step S104 of the flowchart, the size of the illumination region 91 is changed in a similar shape. However, not only the change into a similar shape, but also a change of the shape itself may be performed. For example, the circular illumination region 91 may be incrementally shaped to be finally formed in a triangular shape, or the circular illumination region 91 may be incrementally shaped to be finally formed in an annular shape with a predetermined width.

<Method Using Genetic Algorithm>

Next, a method using the genetic algorithm will be described. The genetic algorithm is a method of finding an illumination shape by acquiring the picture data pieces, which are respectively associated with a plurality of illumination shapes provided in advance, and performing combination of the illumination shapes appropriate for the observation of the specimen 60.

Figure 6:
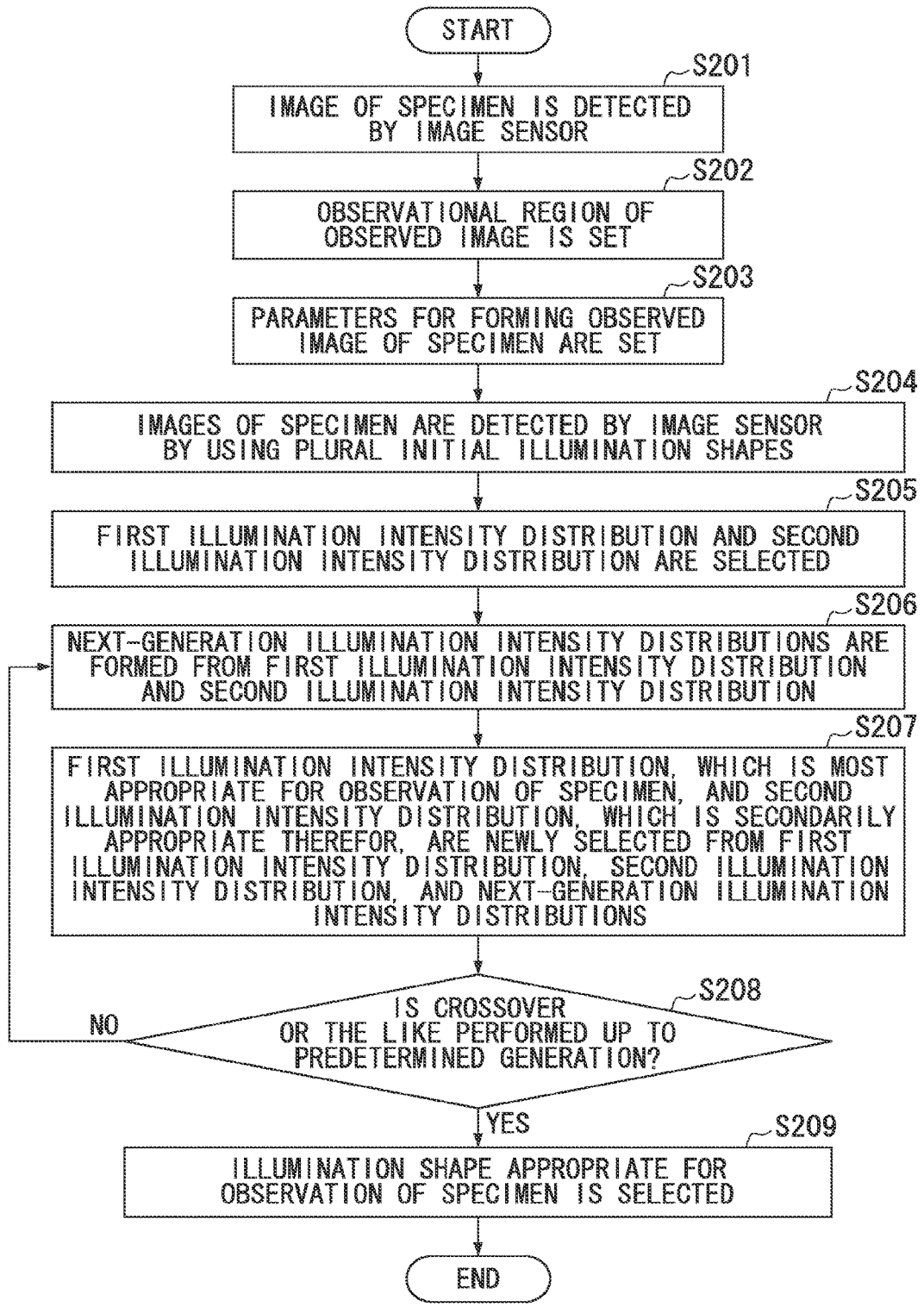
FIG. 6 is a flowchart in which a genetic algorithm is used.

FIG. 6 is a flowchart in which the genetic algorithm is used.

First, in step S201, the illumination region 91 of the first spatial light modulation element 90 is set to have the size and the shape of the initial setting. For example, the illumination region 91 of the initial setting has a circular shape with the maximum diameter. In this state, the image of the specimen 60 is detected by the image sensor 80.

In step S202, the observational region 24 of the observed image is set by the region setting portion 22. Through step S201, the picture of the image of the specimen 60 is displayed in the region setting portion 22.

In step S203, parameters for forming the observed image of the specimen 60 are set. In the parameter setting portion 23, the observer is able to set parameters for inputting the observation condition, which is requested and allowed by the observer, for the observed image of the specimen 60. Like parameters shown in FIG. 4A, examples of the set parameters include the specific location of the specimen 60, the spatial frequency band and the wavelength band of the specimen 60, and the like. However, as shown in FIG. 4B, it is not necessary for the observer to set the illumination region 91 of the first spatial light modulation element 90. The calculation section 20 arbitrarily initializes the illumination region 91.

In step S204, by using two or more initial plural illumination shapes, the images of the specimen 60 are detected by the image sensor 80. Then, the calculation section 20 acquires the respective pieces of the output data of the pictures of the image by which the specimen 60 is measured by using the plural illumination shapes. Referring to FIG. 7, examples of the plural illumination shapes will be described.

FIG. 7 shows diagrams of various illumination shapes of the first spatial light modulation element 90. In FIG. 7, the outlined part represents the illumination region 91, and the hatched region represents the light blocking section 92.

Figure 7A:
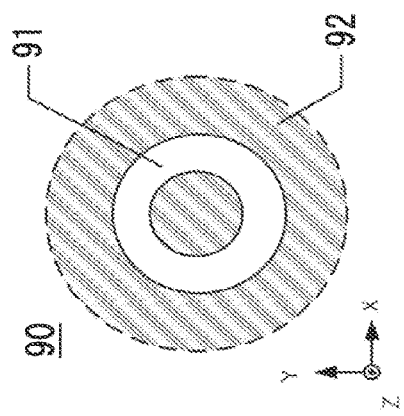
FIG. 7A is a schematic top plan view of the first spatial light modulation element 90 having the illumination region 91 with a circular shape of which the diameter is large.
Figure 7B:
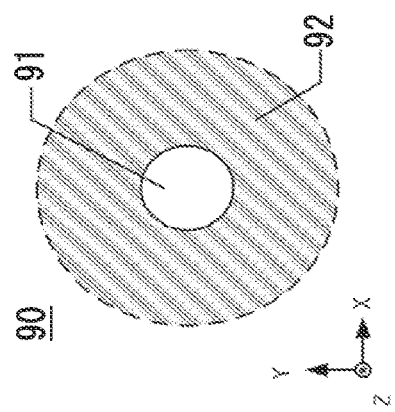
FIG. 7B is a schematic top plan view of the first spatial light modulation element 90 having the illumination region 91 with a circular shape of which the diameter is small.
Figure 7C:
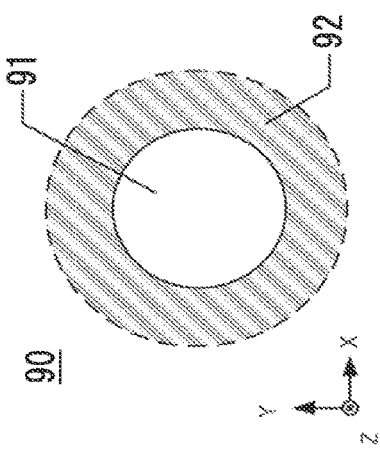
FIG. 7C is a schematic top plan view of the first spatial light modulation element 90 having the illumination region 91 with an annular shape.

FIG. 7A is a schematic top plan view of the first spatial light modulation element 90 having the circular illumination shape of which the diameter is large. The illumination shape of the first spatial light modulation element 90 may be, as shown in FIG. 7A, a circular shape which is axisymmetric with respect to the optical axis of the illumination optical system. FIG. 7B is a schematic top plan view of the first spatial light modulation element 90 having the circular illumination shape of which the diameter is small. FIG. 7B shows a circular shape in which only the size of the illumination shape is different from that of FIG. 7A and which is axisymmetric with respect to the optical axis of the illumination optical system 40. The illumination shape of the first spatial light modulation element 90 may include, as shown in FIG. 7B, a figure with a shape similar to the other figure. FIG. 7C is a schematic top plan view of the first spatial light modulation element 90 having the large annular illumination shape. In FIG. 7C, light is blocked at the center portion of the large circular illumination shape of FIG. 7A.

Figure 7D:
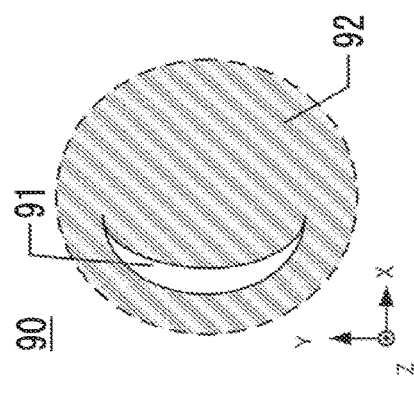
FIG. 7D is a schematic top plan view of the first spatial light modulation element 90 having illumination regions 91 with four small circular shapes, the illumination regions 91 being axisymmetrically disposed with respect to the optical axis.
Figure 7E:
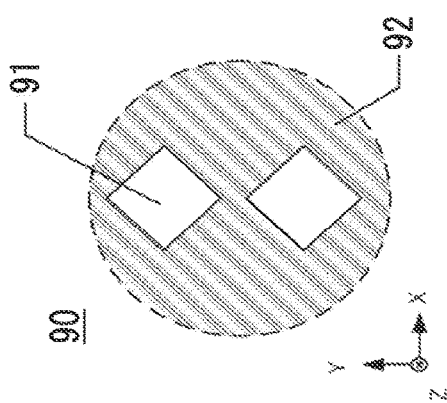
FIG. 7E is a schematic top plan view of the first spatial light modulation element 90 having illumination regions 91 with two quadrangular shapes, the illumination regions 91 being axisymmetrically disposed with respect to the optical axis.

Furthermore, FIG. 7D is a schematic top plan view of the first spatial light modulation element 90 having the illumination shape in which the illumination regions 91 with four circular shapes each having a small diameter are axisymmetrically disposed with respect to the optical axis. FIG. 7E is a schematic top plan view of the first spatial light modulation element 90 having the illumination shape in which the illumination regions 91 with two quadrangular shapes are provided and are axisymmetrically disposed with respect to the optical axis.

Figure 7F:
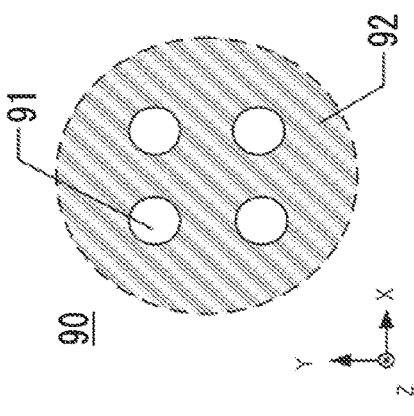
FIG. 7F is a schematic top plan view of the first spatial light modulation element 90 in which the illumination region 91 is non-axisymmetrically formed.

FIG. 7F is a schematic top plan view of the first spatial light modulation element 90 in which the illumination region 91 is non-axisymmetrically formed with respect to the optical axis. In FIG. 7F, the illumination shape of the first spatial light modulation element 90 is formed as a crescent shape, and is non-axisymmetric with respect to the optical axis. Normally, the non-axisymmetric illumination region 91 is mostly used in inclined illumination, and thus it is possible to increase the contrast of the specimen 60. However, the non-axisymmetric illumination region 91 increases the contrast of only a part of the object, whereby a picture having an uneven contrast is obtained, and thus is inappropriate to observe the entire specimen 60. Hence, for the genetic algorithm, it is preferable that the parameter setting portion 23 of the display section 21 shown in FIG. 4A be configured such that whether or not to use the non-axisymmetric opening is selectable.

Returning to FIG. 6, in step S205, by comparing the respective pieces of the output data of the picture of the specimen 60 acquired in step S204, the first intensity distribution of the illumination light, which is formed in an illumination shape most appropriate for the set parameters among the output data pieces, and the second intensity distribution of the illumination light, which is formed in an illumination shape secondarily appropriate therefor, are selected.

In step S206, the calculation section 20 forms illumination shapes, which have next-generation intensity distributions of the illumination light, from the first illumination intensity distribution and the second illumination intensity distribution in accordance with a method of crossover or mutation of the genetic algorithm. Referring to FIG. 8, a description will be given of an example in which the illumination shapes having the next-generation intensity distributions of the illumination light are formed.

Figure 8A:
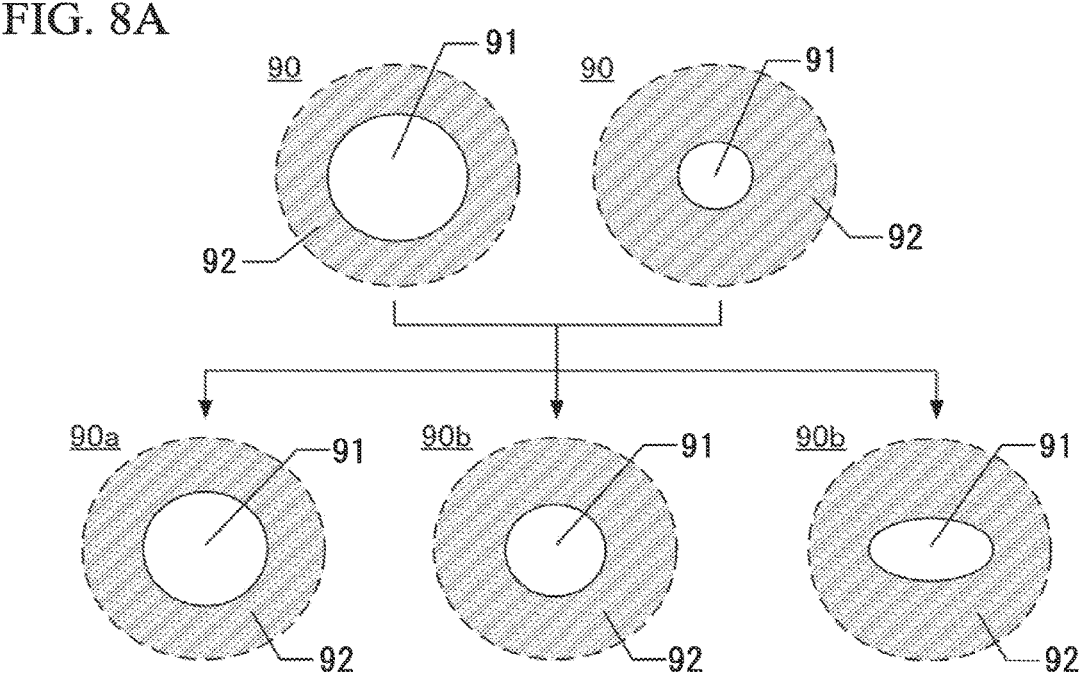
FIG. 8A is a diagram illustrating examples of combinations between FIG. 7A and FIG. 7B.

FIG. 8A is a diagram illustrating examples of combinations of the first spatial light modulation element 90 between FIG. 7A and FIG. 7B. In step S205, the first intensity distribution of the illumination light has a circular illumination shape with a large diameter shown in FIG. 7A, and the second intensity distribution of the illumination light has a circular illumination shape with a small diameter shown in FIG. 7B. The calculation section 20 is able to form a plurality of new illumination shapes by crossing (combining) the two shapes. Examples of the formed illumination shape include: a first spatial light modulation element 90a that has an illumination region 91 with a diameter which is slightly smaller than that of the illumination region 91 of FIG. 7A; a first spatial light modulation element 90b that has an illumination region 91 with a diameter which is slightly larger than that of the illumination region 91 of FIG. 7B; a first spatial light modulation element 90c in which the illumination region 91 is formed in an ellipse shape; and the like.

Figure 8B:
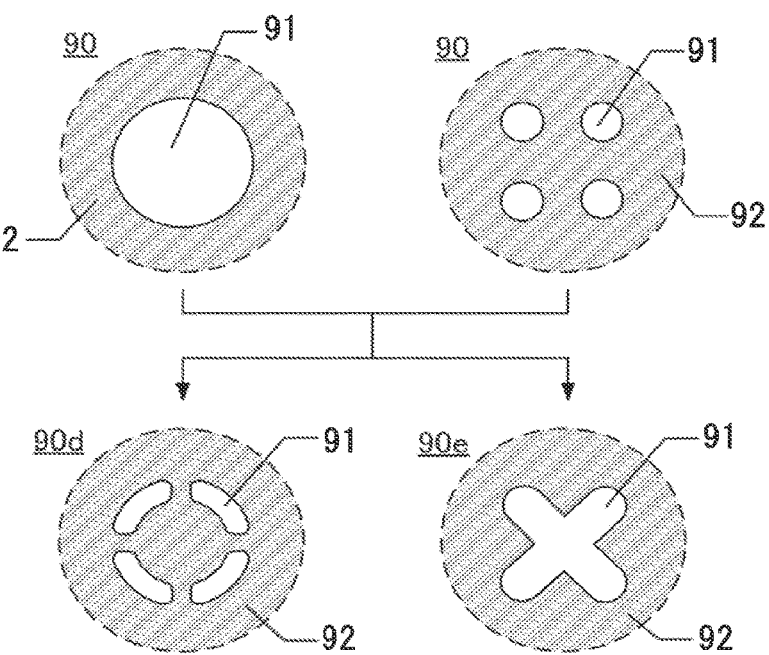
FIG. 8B is a diagram illustrating examples of combinations between FIG. 7A and FIG. 7D.

FIG. 8B is a diagram illustrating examples of combinations of the first spatial light modulation element 90 between FIG. 7A and FIG. 7B. In step S205, the first intensity distribution of the illumination light has a circular illumination shape with a large diameter shown in FIG. 7A, and the second intensity distribution of the illumination light has an illumination shape in which the four small circular illumination regions 91 shown in FIG. 7D are axisymmetrically disposed with respect to the optical axis. By crossing (combining) the two shapes, the calculation section 20 is able to form, for example: a first spatial light modulation element 90d that has illumination regions 91 having a shape in which four parts of a circular ring are axisymmetrically disposed with respect to the optical axis; a first spatial light modulation element 90e in which an illumination region 91 is formed in the shape of "X"; and the like.

FIGS. 8A and 8B are just examples of the combinations. In practice, the shape of the first spatial light modulation element 90 is randomly formed, and thus shapes of the illumination regions 91 newly formed are innumerable. The number of the shapes of the illumination regions 91 may be a few. Furthermore, the combination may be performed by using a different method. For example, the first spatial light modulation element 90 may be divided into a plurality of microscopic regions, and operations such as recombination and mutation may be performed on each region. Furthermore, by creating an independent function, the combination may be performed in terms of the function.

Returning to FIG. 6, in step S207, the first illumination intensity distribution, which is most appropriate for the observation of the specimen 60, and the second illumination intensity distribution, which is secondarily appropriate therefor, are selected from the first illumination intensity distribution, the second illumination intensity distribution, and the next-generation illumination intensity distributions.

In step S208, it is determined whether crossover or mutation is performed up to a predetermined generation, for example, 1000 generations. If crossover or the like is not performed up to the predetermined generation, the procedure returns to step S206, and the illumination intensity distribution further appropriate for the observation of the specimen is searched. If crossover or the like is performed up to the predetermined generation, the procedure advances to step S209.

In step S209, from the illumination regions 91 which are obtained by crossover or the like up to the predetermined generation, for example, the 1000 generations, the illumination shapes at a generation approximate to the condition requested by the observer is selected. Thereafter, the first spatial light modulation element 90 of the illumination shape at the generation is used in the observation of the specimen 60.

<<Method 1 of Estimating Object Information>>

When the structure or the characteristic of the specimen 60 is unknown, it is preferable that structure or characteristic information of the specimen 60 be acquired before the illumination shape, which is most appropriate to the specimen 60, is derived. The reason is that, by referring to the structure or the characteristic of the specimen 60 in the case of estimating the most appropriate observation condition, it is possible to reliably obtain the most appropriate observation condition for a shorter period of time. Hereinafter, a description will be given of the method of estimating phase information of the specimen 60, microscopic structure information, and information on characteristics of the wavelength of the illumination light.

<Estimation Method 1 of Phase Information of Object>

By changing the shape of the illumination region 91 of the first spatial light modulation element 90 and observing the specimen 60, it is possible to estimate whether the contrast of the specimen 60 is an intensity object of which the contrast is high or a phase object of which the contrast is low. Whether or not the specimen 60 is the phase object or the intensity object can be estimated by illuminating rays with different values of the coherence factor (a) on the specimen 60. The value of σ is defined by σ=NA'/NA. NA' is a numerical aperture of the illumination optical system 40, and NA is a numerical aperture of the objective lens 71. The numerical aperture NA' of the illumination optical system 40 can be controlled by changing the shape of the illumination region 91 of the first spatial light modulation element 90. In NA', the illumination region 91 is assumed as a point shape (hereinafter referred to as a point light source), whereby the value of σ is regarded as 0. Furthermore, when the illumination region 91 of the first spatial light modulation element 90 has a circular shape of which the diameter is large, NA' is equal to 1.

Figure 9A:
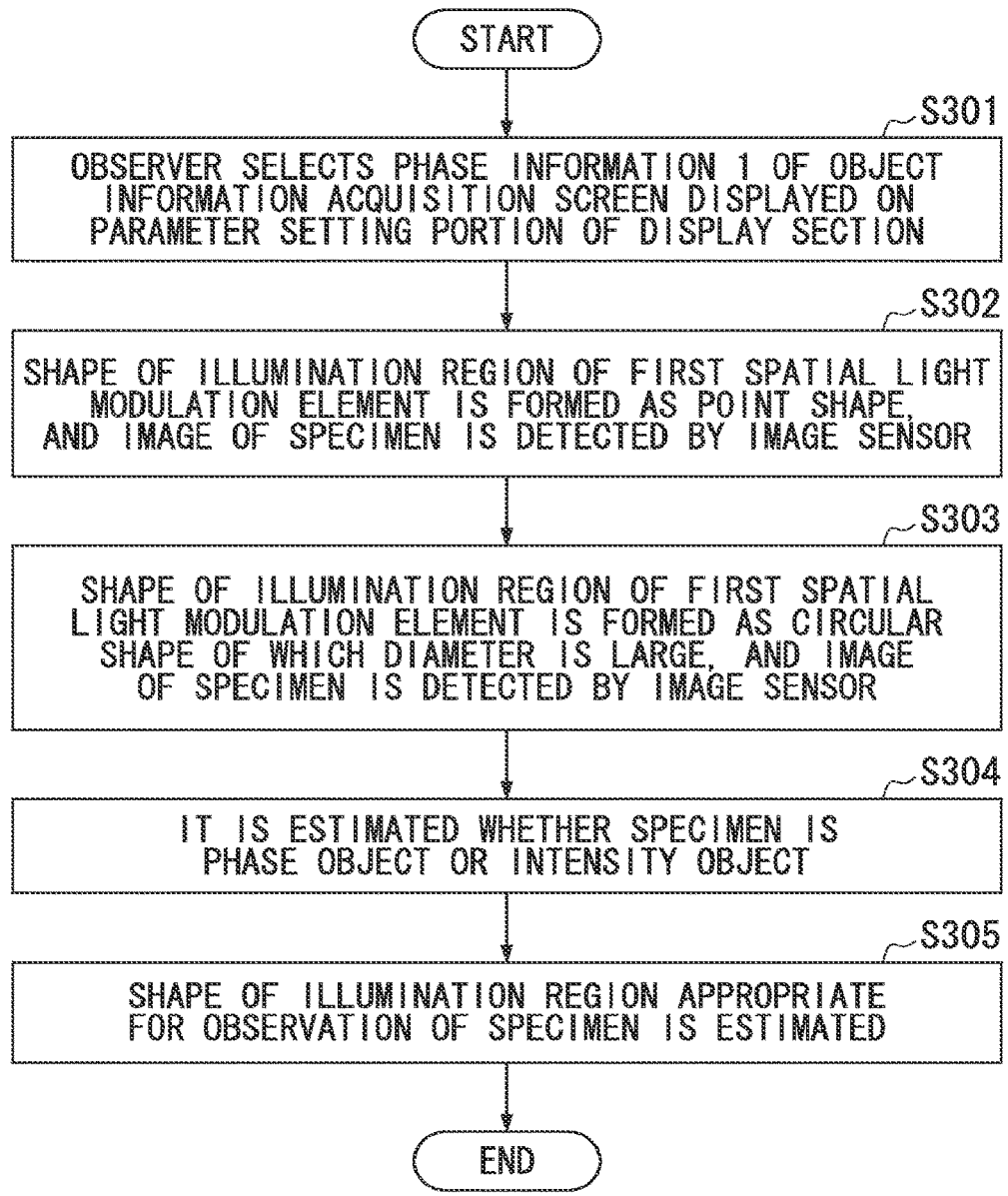
FIG. 9A is a flowchart of method 1 of estimating phase information of a specimen 60.

FIG. 9A is a flowchart of method 1 of estimating phase information of a specimen 60.

Figure 9B:
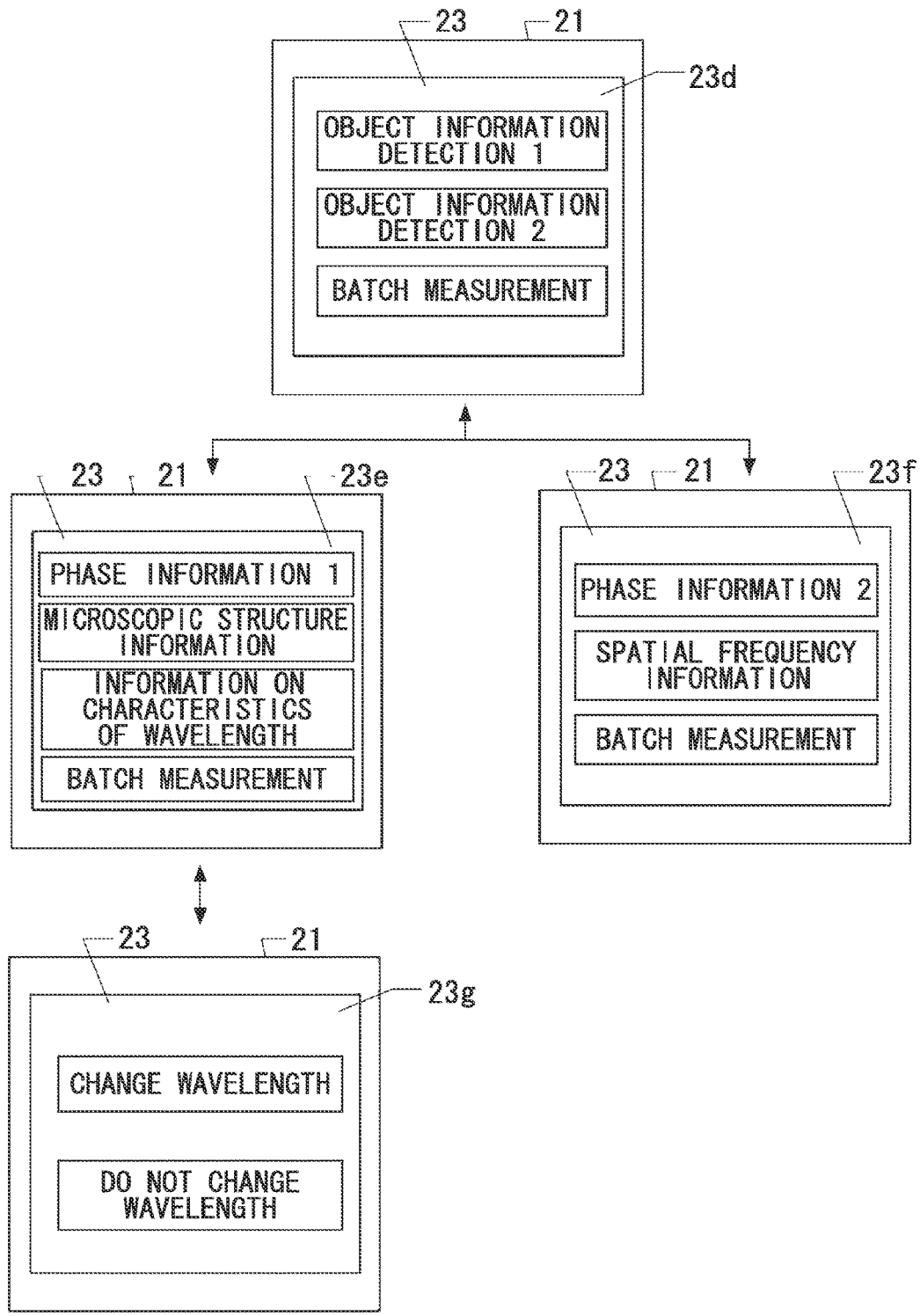
FIG. 9B is a diagram of an object information acquisition screen 23d displayed on a parameter setting portion 23 of the display section 21.

First, in step S301, the observer selects the phase information of the object information acquisition screen 23e displayed on the display section 21 of FIG. 9B.

FIG. 9B is a diagram of the region setting portion 22 and the parameter setting portion 23 of the display section 21 in the method of estimating object information. First, an object information acquisition screen 23d is displayed on the parameter setting portion 23 of the display section 21. The observer selects the object information detection 1 when performing method 1 of estimating the phase information of the object through the object information acquisition screen 23d, selects the object information detection 2 when performing method 2 of estimating the phase information of the object to be described later, and selects batch measurement when performing both of the method 1 of estimating the phase information of the object and the method 2 of estimating the phase information of the object. When method 1 of estimating the phase information of the object is selected, the screen is changed into the object information acquisition screen 23e, and when method 2 of estimating the phase information of the object is selected, the screen is changed into the object information acquisition screen 23f. Furthermore, the object information acquisition screen 23g is a screen which is changed from the object information acquisition screen 23e.

The object information acquisition screen 23e displays items of the phase information 1, the microscopic structure, characteristics of the wavelength, and the batch measurement. Here, when the phase information 1 is selected, the calculation section 20 performs method 1 of estimating the phase information of the object. When the microscopic structure is selected, the calculation section 20 performs the method of estimating information of the microscopic structure of the object. When the characteristics of the wavelength are selected, the calculation section 20 performs the method of estimating the information of the characteristics of the wavelength of the object. Furthermore, when the batch measurement is selected, the calculation section 20 performs all estimations of the items. After each selection item is selected, information of the selected item is automatically acquired.

Returning to FIG. 9A, in step S302, the shape of the illumination region 91 of the first spatial light modulation element 90 is formed as a point light source ($\sigma \approx 0$), and the image of the specimen 60 formed by the illumination of the point light source is detected by the image sensor 80. If the irradiated light is coherent, the contrast is observed in the specimen 60 even when the specimen 60 is the phase object or the intensity object.

Next, in step S303, the shape of the illumination region 91 of the first spatial light modulation element 90 is formed as a circular shape ($\sigma \approx 1$) of which the diameter is large, and the image of the specimen 60 formed by the illumination of the large circular shape is detected by the image sensor 80. If the irradiated light is incoherent, the specimen 60 as the intensity object can be observed since the contrast is present in the specimen 60, but the specimen 60 as the phase object cannot be observed since the contrast is absent in the specimen 60.

Subsequently, in step S304, it is estimated whether the specimen 60 is the phase object or the intensity object. If there is no change between the image formed by the coherent light detected in step S302 and the image formed by the incoherent light detected in step S303, it is estimated that the specimen 60 is the intensity object. If there is a difference between the image formed by the coherent light detected in step S302 and the image formed by the incoherent light detected in step S303, it is estimated that the specimen 60 is the phase object.

Next, in step S305, the shape of the illumination region 91 appropriate for the observation of the specimen 60 is estimated. As in the phase object, the calculation section 20 sets the shape of the illumination region 91 of the first spatial light modulation element 90 as small or inclined illumination (for example, refer to FIG. 7F). The reason is that, when the specimen 60 is the phase object, small or inclined illumination in the shape of the illumination region 91 is appropriate for the observation of the specimen 60. Furthermore, when the specimen 60 is the intensity object, the calculation section 20 increases the diameter of the circle of the illumination region 91 of the first spatial light modulation element 90. The reason is that the intensity object can be easily observed when the amount of light is great.

<Estimation Method of Microscopic Structure Information of Object>

Whether or not a microscopic structure is included in the specimen 60 can be estimated by changing the shape of the illumination region 91 of the first spatial light modulation element 90 and observing the specimen 60.

Figure 9C:
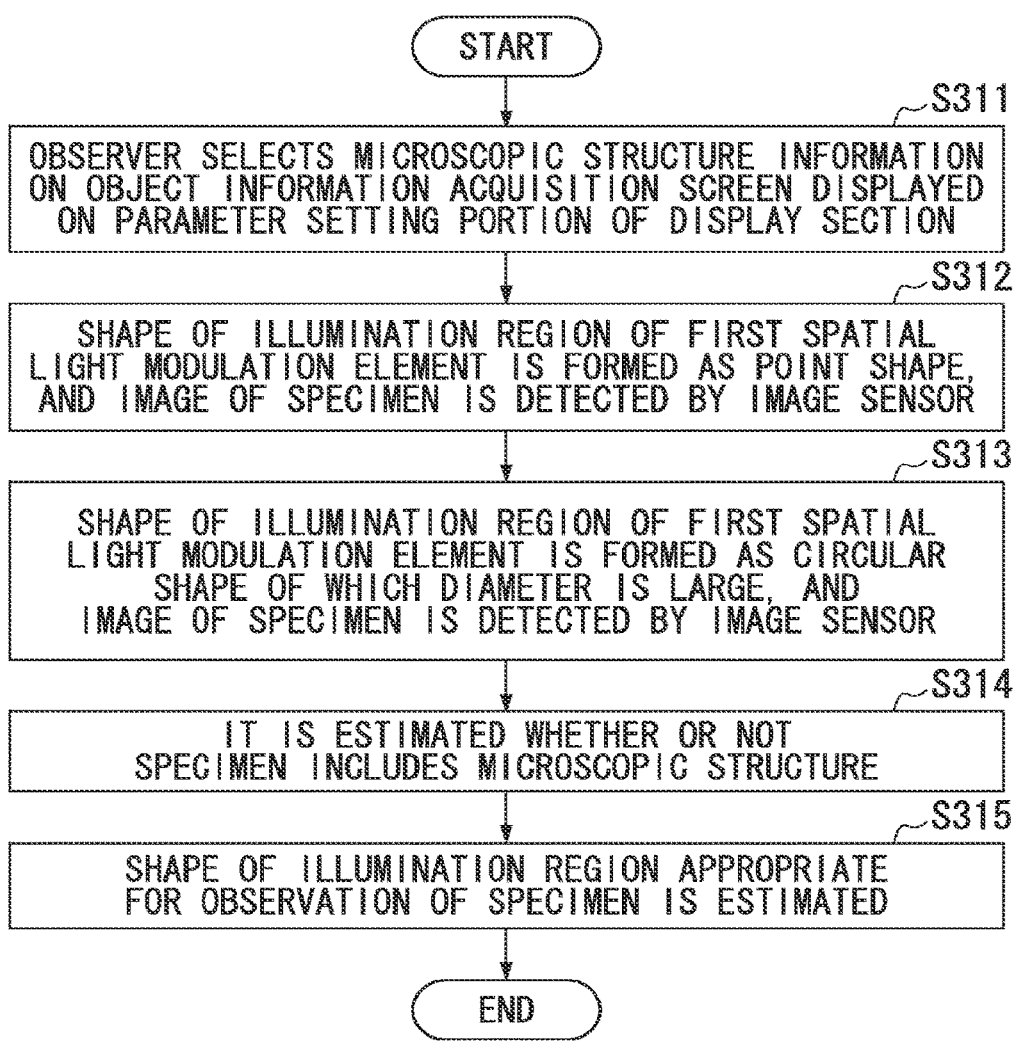
FIG. 9C is a flowchart of a method of estimating microscopic structure information of the specimen 60.

FIG. 9C is a flowchart of a method of estimating the microscopic structure information of the specimen 60. First, in step S311, the observer selects the microscopic structure information on the object information acquisition screen 23e displayed on the display section 21 of FIG. 9B.

Next, in step S312, the shape of the illumination region 91 of the first spatial light modulation element 90 is formed as a point light source, and the image of the specimen 60 is detected by the image sensor 80. When the shape of the illumination region 91 of the first spatial light modulation element 90 is the point light source ($\sigma=0$), even if the specimen 60 includes a microscopic structure, the microscopic structure does not appear in the image of the specimen 60.

Subsequently, in step S313, the shape of the illumination region 91 of the first spatial light modulation element 90 is formed as an annular shape, the image of the specimen 60 is detected by the image sensor 80. At this time, it is preferable that the contour of the annular shape be large. When the shape of the illumination region 91 is the annular shape, if the specimen 60 includes a microscopic structure, the microscopic structure is detected.

Next, in step S314, it is estimated whether or not the specimen 60 includes a microscopic structure. If there is no change between the images of the specimen 60 obtained when the illumination region 91 is formed as the point light source and when it is formed as the annular shape, the calculation section 20 determines that the specimen 60 does not include a microscopic structure. In contrast, there may be a difference in the output data between the images of the specimen 60 obtained when the illumination region 91 is formed as the point light source and when it is formed as the annular shape, and the image of the specimen 60 may be detected when the illumination region 91 is formed in the annular shape. In this case, the calculation section 20 determines that the specimen 60 includes a microscopic structure.

Thereafter, in step S315, the shape of the illumination region 91 appropriate for the observation of the specimen 60 is estimated. For example, if the specimen 60 includes a microscopic structure, it is preferable that the illumination region 91 be formed in the annular shape or the like.

<Method of Estimating Information on Characteristics of Wavelength of Illumination Light of Object>

When the wavelength of the illumination light on the specimen 60 is changed, different output data may be shown due to the structure and the characteristics of the specimen 60. Hence, it is preferable to grasp the characteristics of the wavelength of the illumination light of the specimen 60.

Figure 9D:
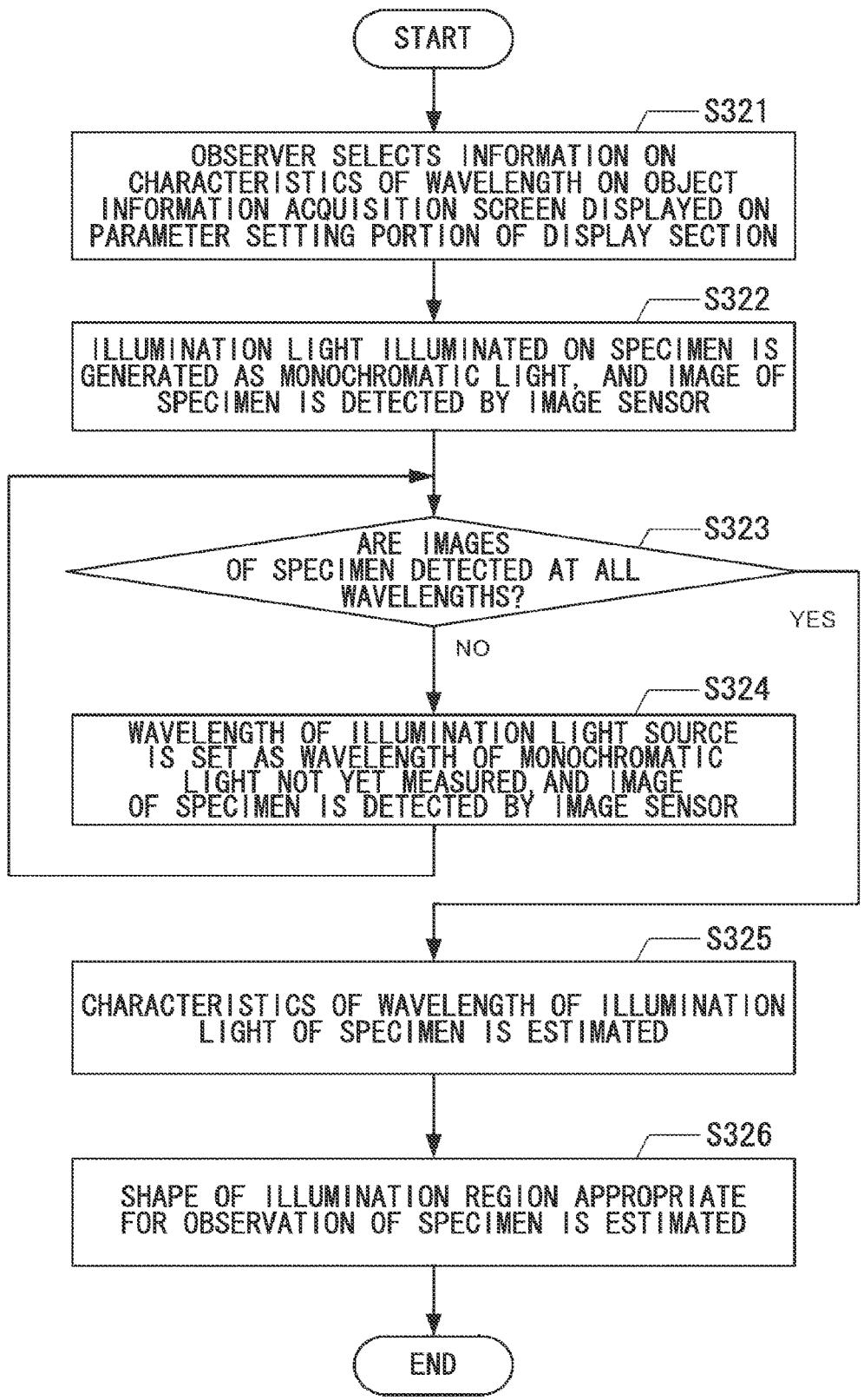
FIG. 9D is a flowchart of a method of estimating information on characteristics of the wavelength of the illumination light of the specimen 60.

FIG. 9D is a flowchart of a method of estimating information on characteristics of the wavelength of the illumination light of the specimen 60.

First, in step S321, the observer selects the information on the characteristics of the wavelength on the object information acquisition screen 23e displayed on the display section 21 of FIG. 9B.

Next, in step S322, the illumination light illuminated on the specimen 60 is generated as monochromatic light, and the image of the specimen 60 is detected by the image sensor 80. For example, it is assumed that the illumination light source 30 employs LEDs having light sources of three colors of red, blue, and green. In this case, for example, only the green LED is turned on, and the LEDs with different wavelengths are turned off. Then, the image of the specimen 60 is detected by the image sensor 80.

Subsequently, in step S323, it is determined whether the images of the specimen 60 are detected at all wavelengths. For example, if the image of the specimen 60 is detected at each wavelength of red, blue, and green, the procedure advances to step S325. If there is a wavelength at which the image of the specimen 60 is not yet detected, the procedure advances to step S324.

Next, in step S324, as the wavelength of the illumination light source 30, the wavelength at which the image of the specimen 60 is not yet acquired is selected, and the image of the specimen 60 is detected by the image sensor 80. For example, if only the image of the specimen 60 at the wavelength of green is acquired, the red or blue LED is turned on, and the LEDs with different wavelengths are turned off. In this state, the image of the specimen 60 is detected by the image sensor 80. Thereafter, the procedure returns to step S323 again, and it is verified whether or not the images of the specimen 60 are detected at all the wavelengths.

In step S325, the characteristics of the wavelength of the illumination light of the specimen 60 are estimated. The images of the specimen 60 detected in steps S322 and S324 are compared. For example, if the image of the specimen 60 detected at the wavelength of blue is better in contrast than the images of the specimen 60 at different wavelengths, the calculation section 20 determines that the specimen 60 has fine contrast at the wavelength of blue.

Next, in step S326, the calculation section 20 estimates the illumination light with the wavelength most appropriate for the observation of the specimen 60. For example, when the specimen 60 is intended to be observed with the maximum contrast given thereto, and when the wavelength of blue is used in step S325, the image of the specimen 60 may be observed with the contrast, which is greater than that of the images detected at different wavelengths, given thereto. In this case, the calculation section 20 determines that the illumination light with the wavelength of blue is appropriate for the observation of the specimen 60.

In this method of estimating the information on characteristics of the wavelength of the illumination light of the object, the shape of the illumination region 91 may be a random shape. However, by using the method together with the above-mentioned method 1 of estimating the phase information of the object and the method of estimating the microscopic structure information of the object, sometimes, it may be possible to further reliably estimate the phase information and the microscopic structure information of the object. In this case, after the phase information or the microscopic structure information is selected through the object information acquisition screen 23e shown in FIG. 9B, by changing the screen into the object information acquisition screen 23g shown in FIG. 9B, whether or not to change the wavelength may be selectable.

By performed the above-mentioned method 1 of estimating the object information before performing the above-mentioned method of deriving the illumination shape, it is possible to reduce the time to derive the illumination shape.

<<Method 2 of Estimating Object Information>>

In the flowchart shown in FIGS. 3 and 6, in steps S103 and S203, the parameters for setting the observational image of the specimen 60 are set. As in the line width of the integrated circuit of the semiconductor or the like, when it is possible to obtain the object information of the specimen 60 in advance, the observer is able to set the parameters on the basis of the information. However, when the specimen 60 is a biological object, in most cases, the object information of the specimen 60 may not be obtained, and thus the observer may not know which the better way to set parameters is. Furthermore, the information, which is obtained by method 1 of estimating the object information, may be insufficient. In such a case, before the illumination shape is determined, the object information may be further specifically checked out. Hereinafter, method 2 of estimating the phase information of the object and the method of detecting the spatial frequency information of the object will be described.

Method 2 of estimating the object information is performed in such a way that the observer selects the object information detection 2 through the object information acquisition screen 23d of FIG. 9B. After the object information detection 2 is selected, the screen is changed into the object information acquisition screen 23f. The object information acquisition screen 23f displays items of the phase information 2, the spatial frequency information, and the batch measurement. Here, when the phase information 2 is selected, method 2 of estimating the phase information of the object is performed, and when the spatial frequency information is selected, the method of detecting the spatial frequency information of the object is performed. Furthermore, when the batch measurement is selected, all estimations of the items are performed. After each selection item is selected, information of the selected item is automatically acquired.

<Method 2 of Estimating Phase Information of Object>

The phase information of the object can be estimated by measuring the specimen 60 in a state where the illumination region 91 of the first spatial light modulation element 90 has a minimum size so as to be formed as the point light source and the illumination light is set as monochromatic light. Regarding the wavelength of the monochromatic light, when the wavelength appropriate for the observation of the specimen 60 is estimated through method 1 of estimating the object information or the like, it is preferable that the wavelength be set as a wavelength of the illumination light.

Method 2 of estimating the phase information of the object is performed by selecting the phase information 2 through the object information acquisition screen 23f of FIG. 9B. Hereinafter, referring to FIG. 10A, method 2 of estimating the phase information of the specimen 60 will be described.

Figure 10A:
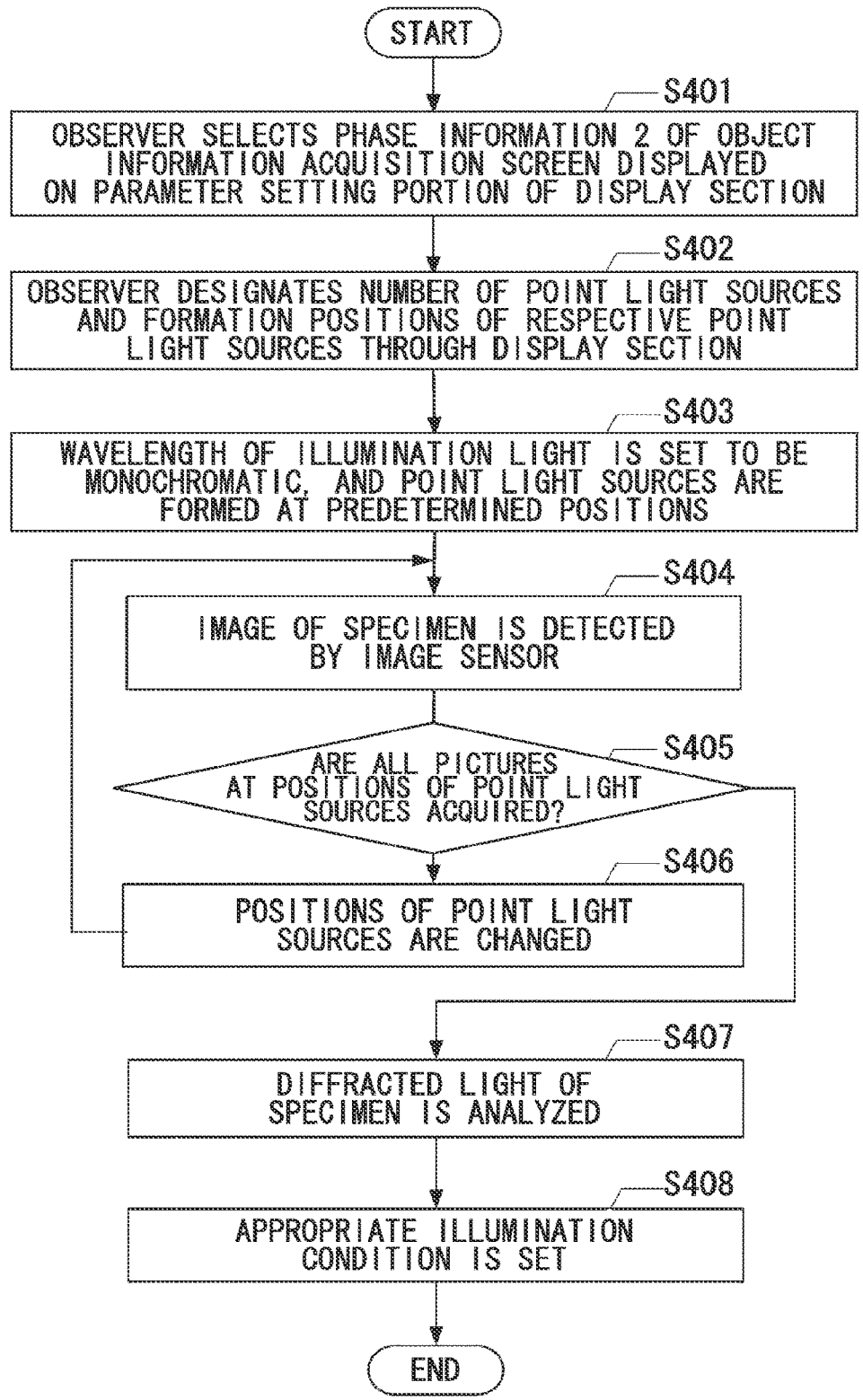
FIG. 10A is a flowchart of method 2 of estimating phase information of the specimen 60.

FIG. 10A is a flowchart of method 2 of estimating phase information of the specimen 60.

First, in step S401, the observer selects the phase information 2 through the object information acquisition screen 23f of FIG. 9B. Thereafter, the display section 21 is changed to the screen shown in FIG. 10B to be described later.

Figure 10B:
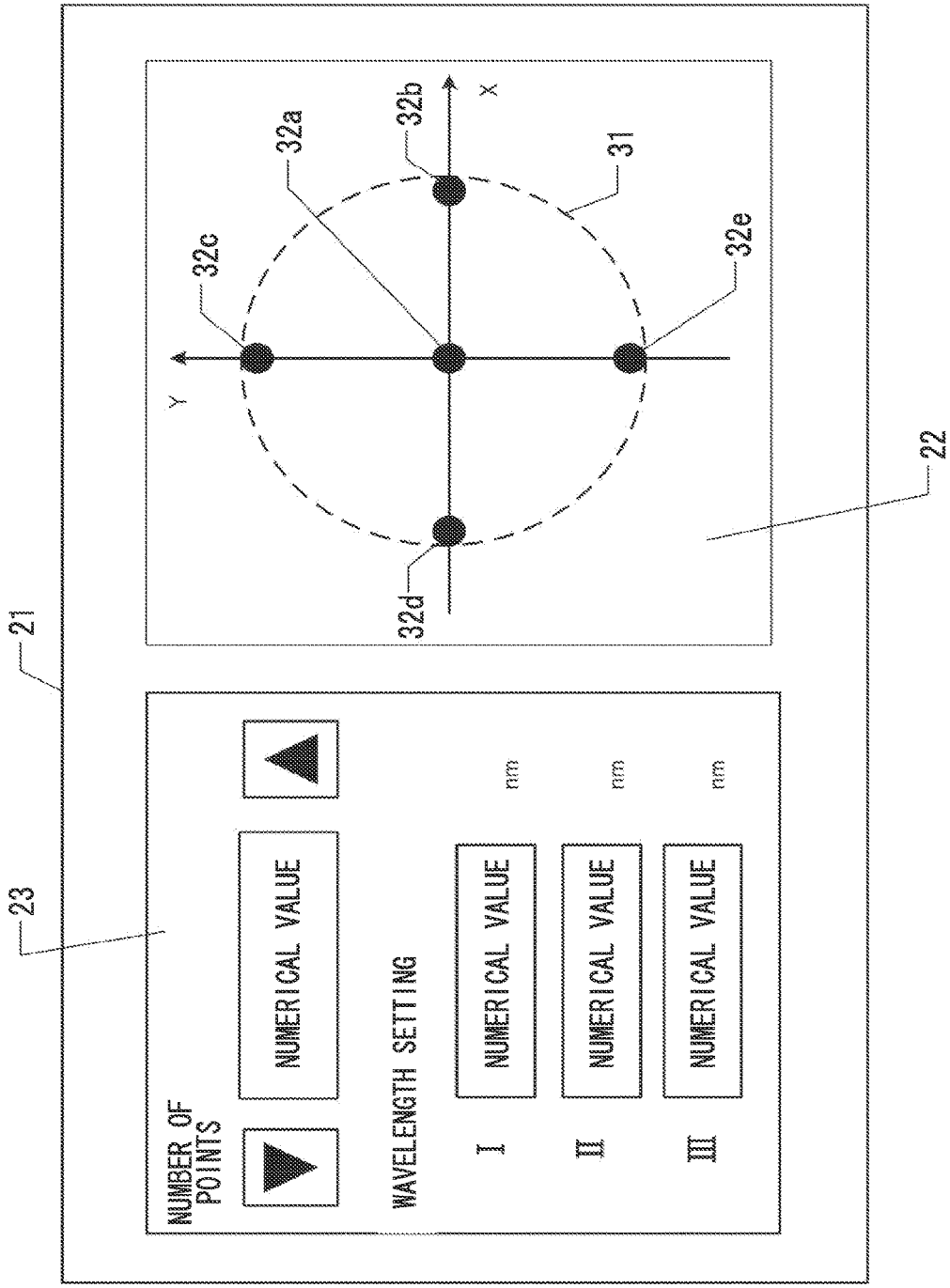
FIG. 10B is a diagram of the display section 21 shown in the schematic view of the first spatial light modulation element 90.

First, in step S402, the observer designates the number of the point light sources and the formation positions of the respective point light sources through the screen displayed on the display section 21 of FIG. 10B. Hereinafter, referring to FIG. 10B, examples of the number of the point light sources and the formation positions of the respective point light sources will be described.

FIG. 10B is a diagram of the display section 21 shown in the schematic view of the first spatial light modulation element 90. In FIG. 10B, a circle 31, which is indicated by the dotted line, in the region setting portion 22 of the display section 21 represents a state in which the diameter of the light transmitted through the first spatial light modulation element 90 is maximized. The point light source ($\sigma \approx 0$), which is used in the estimation of the phase information of the specimen 60, is shaped into a point light source or is shaped to have a size regarded as a point light source. That is, the calculation section 20 forms the illumination regions 91 having point shapes in the first spatial light modulation element 90 inside the circle 31 which is indicated by the dotted line. In FIG. 10B, the number of the point light sources measured by the parameter setting portion 23 of the display section 21 and the wavelength of the used light can be set. When the number of the point light sources is set to 5, a total of 5 point light sources are formed at, for example, the center point (on the optical axis) of the circle 31 and points having positive and negative maximum values on the X and Y axes. Furthermore, the wavelength of the light can be input. Regarding the wavelength, only one wavelength may be input, and a plurality of wavelengths may be input. In this case, measurement of 5 point light sources is performed on each wavelength.

The point light source at the center point of the circle 31 is represented by the black point of the point light source 32a, the point light sources having the positive and negative maximum values on the X axis are respectively represented by the black points of the point light sources 32b and 32d, and the point light sources having the positive and negative maximum values on the Y axis are respectively represented by the black points of the point light sources 32c and 32e. It is preferable that the point light source include a point light source which is formed in the vicinity of the outermost peripheral portion of the circle 31. The reason is that the coherent light can be incident to the specimen 60 at various angles and thus it is possible to obtain diffracted light at the time of the inclined illumination.

In addition, the observer does not set the number of the point light sources and the positions of the respective point light sources, but the calculation section 20 may automatically set the number of the point light sources shown in FIG. 10B to 5.

Next, in step S403, the wavelength of the illumination light is set to be monochromatic, and the first spatial light modulation element 90 forms the point light sources at predetermined positions. The monochromatic illumination light is formed through the wavelength filter 44 which transmits only light with a specific wavelength in, for example, the white illumination light source 30. Furthermore, the first spatial light modulation element 90 forms the illumination region 91 having a size of a single point light source shown in FIG. 10B. In a state of the point light source and in a state where the light with a monochromatic wavelength are coherent, its coherency increases. Hence, this is advantageous in estimating the phase information of the specimen 60.

In step S404, the image of the specimen 60 formed by the point light source and the light with a monochromatic wavelength is detected by the image sensor 80.

In step S405, the calculation section 20 determines whether or not the pictures formed by the light with a monochromatic wavelength and at the positions of all the point light sources are acquired. For example, if all the 5 point light sources shown in FIG. 10B are not measured, the procedure advances to step S406. If all the designated point light sources are measured, the procedure advances to step S407.

In step S406, the calculation section 20 is able to change the positions of the illumination regions 91 serving as the point light sources. For example, in step S404, the point light source 32a of FIG. 10B may be measured, and the point light source 32b may not be measured. In this case, the position of the illumination region 91 is formed only at the position of the point light source 32b. Thereafter, the procedure advances to step S404.

In step S407, the calculation section 20 analyzes the diffracted light of the specimen 60. For example, from the analyzed diffracted light information, it is possible to find distribution of the diffracted light having a specific spatial frequency component in the observational region 24, and thus it is possible to efficiently find the illumination shape appropriate for the observation.

In step S408, the calculation section 20 sets an appropriate illumination condition. Furthermore, the analyzed diffracted light information is displayed on the display section 21, and the observer estimates the phase information of the specimen 60 by referring to the diffracted light information. The observer is able to set the observational region 24 and the parameters on the basis of the estimated phase information through steps S102 and S103 of FIG. 3 and steps S202 and S203 of FIG. 6.

In the above-mentioned method 2 of estimating the phase information of the specimen 60, measurement may be performed for each of the plurality of wavelengths. Hence, in the flowchart shown in FIG. 10A, there may be provided a step for checking whether or not all the wavelengths set in FIG. 10B are measured.

<Method of Detecting Spatial Frequency Information of Object>

The spatial frequency represents the cycle of the iteration of the unit length of the specimen 60. That is, similar structures are highly likely to be collected in a location in which the same spatial frequencies are concentrated. Hence, the information on the spatial frequency of the specimen 60 is used as a reference of the setting of the observational region 24 and the parameters in steps S102 and S103 of FIG. 3 and steps S202 and S203 of FIG. 6. The spatial frequency information of the specimen 60 is detected by acquiring the output data of the picture of the pupil of the imaging optical system 70. Furthermore, through method 2 of estimating the phase information of the specimen 60, the specimen 60 is measured by using the above-mentioned point light source of the monochromatic wavelength. Hereinafter, referring to FIGS. 11 and 12, the method of detecting the spatial frequency information of the specimen 60 will be described.

Figure 11:
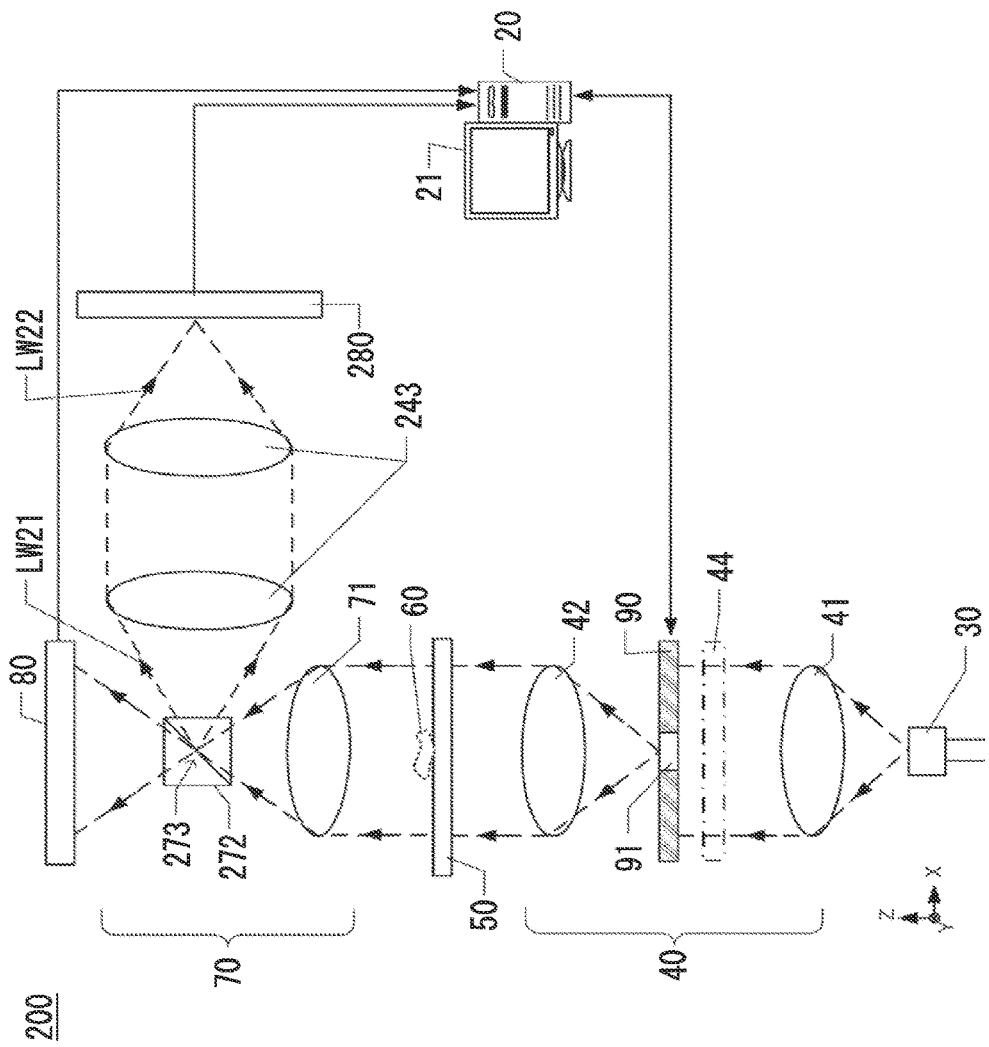
FIG. 11 is a schematic configuration diagram of a microscope system 200.

FIG. 11 is a schematic configuration diagram of a microscope system 200. Hereinafter, the elements common to those of the microscope system 100 described in FIG. 1 will be represented by the same reference numerals, and a detailed description thereof will be omitted.

In the microscope system 200, a beam splitter 272 is disposed at the position of the pupil 273 of the imaging optical system 70 or in the vicinity thereof. Furthermore, the microscope system 200 has a relay lens 243 which relays the split light LW21 and a second image sensor 280 which is disposed at a position conjugate to the position of the pupil 273. The beam splitter 272 splits light from the imaging optical system 70. The split light LW21 is incident to the second image sensor 280 through the relay lens 243. The light LW21 is transmitted through the relay lens 243, and is converted into the light LW22, and the light LW22 forms an image of the pupil 273 on the second image sensor 280. The information of the image of the pupil 273 formed on the second image sensor 280 is sent to and analyzed by the calculation section 20.

Figure 12:
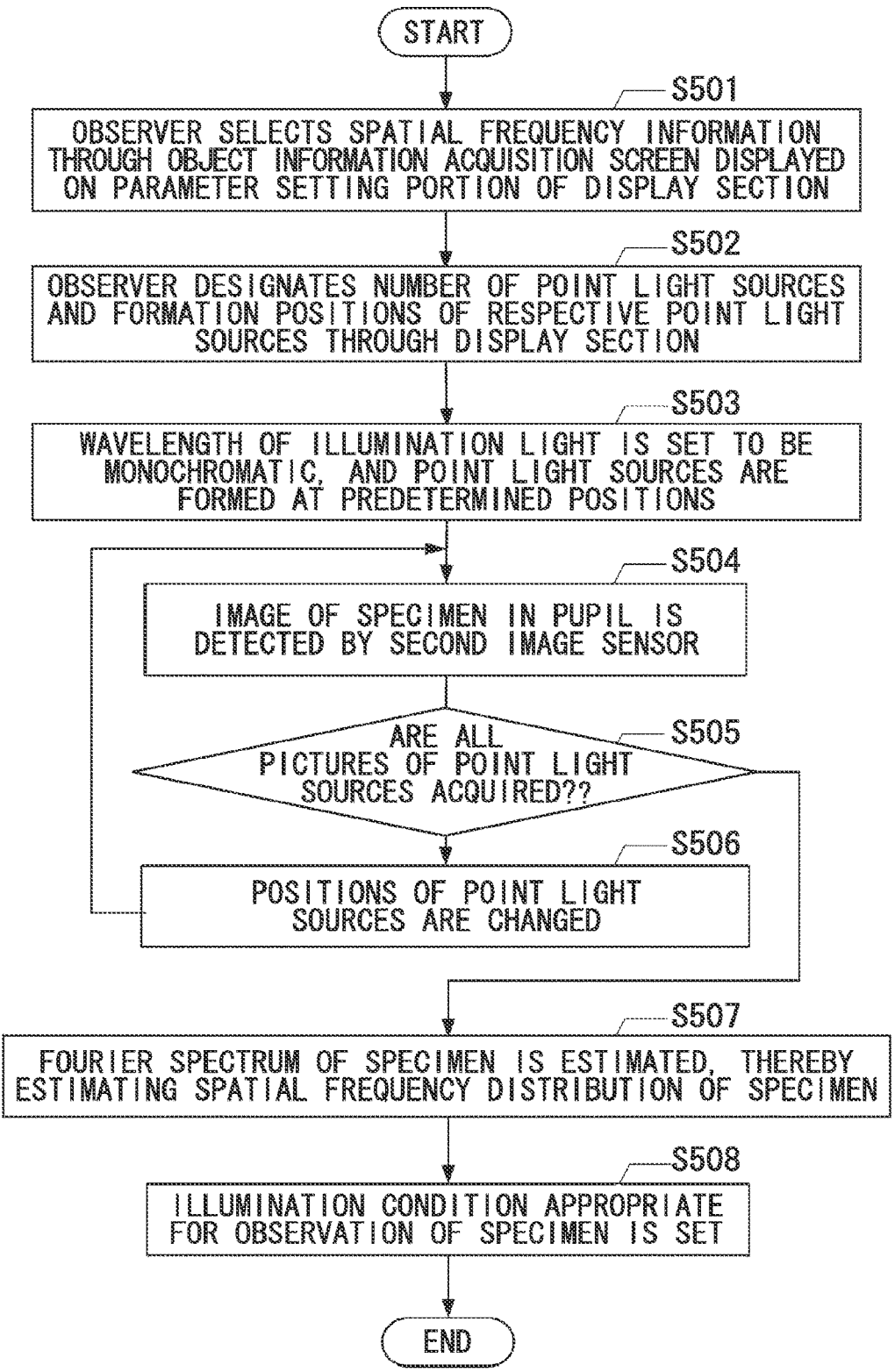
FIG. 12 is a flowchart of a method of detecting spatial frequency information of an object.

FIG. 12 is a flowchart of a method of detecting spatial frequency information of the specimen 60.

First, in step S501, the observer selects the spatial frequency information through the object information acquisition screen 23f of FIG. 9B. Thereafter, the display section 21 is changed to the screen shown in FIG. 10B.

Next, in step S502, the observer designates the number of the point light sources ($\sigma=0$) and the formation positions of the respective point light sources through the display section 21.

Next, in step S503, the wavelength of the illumination light is set to be monochromatic, and an opening with a size close to that of the point light source at a predetermined position is formed.

Steps S502 and S503 are the same as steps S402 and S403 of FIG. 10A. Furthermore, a description will be given of an example in which the number of the formed point light sources is 5 similarly to FIG. 10B.

In step S504, the image of the specimen 60 in the pupil 273 is detected by the second image sensor 280. For example, if the point light source 32a shown in FIG. 10B is designated in step S503, by using only the point light source 32a as the illumination light source, the picture of the specimen 60 is detected by the second image sensor 280.

Figure 13A:
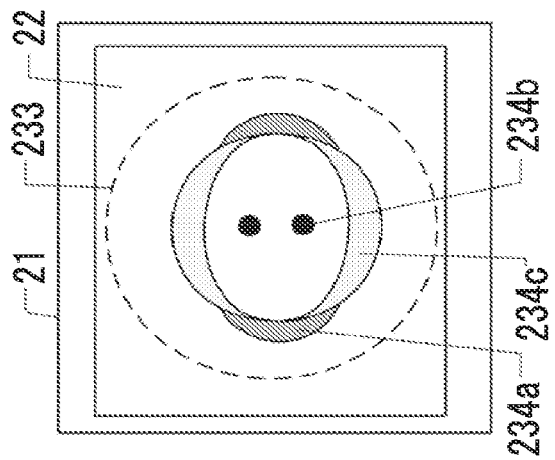
FIG. 13A is a diagram of the display section 21 which displays a picture of an image of a pupil 273 detected by a second image sensor 280 in a case where the specimen 60 is an integrated circuit (IC).

FIG. 13A is a diagram of the display section 21 which displays the picture of the image of the pupil 273 detected by the second image sensor 280 in a case where the specimen 60 is an integrated circuit (IC). The picture is displayed on, for example, the region setting portion 22 of the display section 21. The circle 233, which is indicated by the dotted line of FIG. 13A, is defined as a range capable of passing the light that can be transmitted. The picture data, which is detected by the second image sensor 280, is light intensity distribution in the pupil 273. The light intensity distribution is, for example, represented by the points 234 of FIG. 13. The position of the point 234 is a detection position of the signal, and the size reflects the size of the point light source. In FIG. 13A, the black point 234 represents that the detected signal is strong, the white point 234 represents that the detected signal is weak, the gray point 234 represents that the detected signal has an intermediate intensity between the black point 234 and the white point 234. The points 234 are actually displayed in a reduced manner, and have almost no size. However, in FIG. 13A, for convenience of description, the points 234 have sizes, and the points 234 have different colors in order to represent the intensities of the signals. In FIG. 13A, the black points 234 are collected in the upper right region of the picture, and the white points 234 are collected in the lower left portion of the screen. This means that the spatial frequency in the upper right portion of the screen is large and the spatial frequency in the lower left portion of the screen is small. Furthermore, the IC has a periodic structure, and thus the points 234 detected by the second image sensor 280 tend to be periodically detected.

Figure 13B:
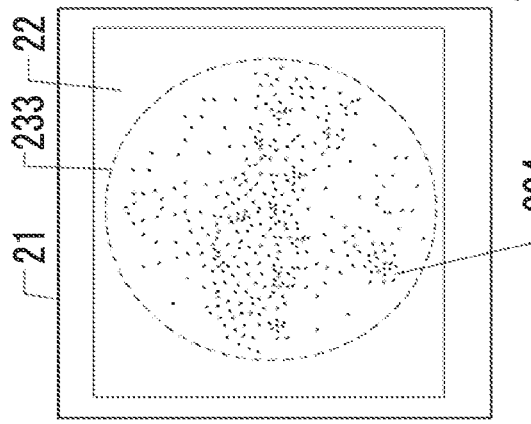
FIG. 13B is a diagram of the display section 21 which displays a picture of an image of the pupil 273 detected by the second image sensor 280 in a case where the specimen 60 is a biological object.

FIG. 13B is a diagram of the display section 21 which displays the picture of the image of the pupil 273 detected by the second image sensor 280 in a case where the specimen 60 is a biological object. In FIG. 13B, the points 234, which are detected by the second image sensor 280, are displayed on the display section 21. In FIG. 13B, the points 234 are represented by points having no size. The points 234 shown in FIG. 13B have signals with different intensities at the respective points similarly to FIG. 13A. When the specimen 60 is a biological object, as indicated by the points 234 of FIG. 13B, the points 234 have no periodicity, and most of them are randomly shown. The reason is that the number of the periodic structures of the biological object is smaller than that of the IC having periodic structures shown in FIG. 13A.

In step S505, it is determined whether or not the light intensity information at the positions of all the point light sources, for example, at the five points is acquired. If the light intensity information of all the point light sources is not acquired, the procedure advances to step S506. If the light intensity information of all the point light sources is acquired, the procedure advances to step S507.

In step S506, the positions of the illumination regions 91 serving as the point light sources are changed. For example, the point light source 32a of FIG. 10B may be measured in step S504, and the point light source 32b may not be measured. In this case, the illumination region 91 is formed only at the position of the point light source 32b. Thereafter, the procedure advances to step S504.

In step S507, the Fourier spectrum of the specimen 60 is measured, thereby calculating the spatial frequency distribution of the specimen 60. The spatial frequency distribution may be, as shown in FIG. 13, represented as the light intensity distribution, and the light intensity distribution is converted into the spatial frequency and is displayed on the display section 21. From the spatial frequency distribution of the specimen 60, the periodicity of the structure of the specimen 60 is calculated. As shown in FIG. 13B, if the spatial frequency distribution of the specimen 60 is random, in this state, the periodicity of the structure of the specimen 60 cannot be calculated.

In step S508, the calculation section 20 sets the illumination condition appropriate for the observation of the specimen 60. Furthermore, the result thereof may be displayed on the display section 21. The observer sets the parameters or sets the observational region 24 through the display section 21 on the basis of the spatial frequency information of the analyzed specimen 60 (refer to FIG. 4). In steps S102 and S103 of FIG. 3 and steps S202 and S203 of FIG. 6, the observer sets the parameters or sets the observational region 24. For example, the collection of the specific spatial frequencies may represent the same structure. If only the structure is intended to be observed, by setting the spatial frequency of the structure intended to be observed through the parameter setting portion 23 of the display section 21, it is possible to adjust the observational image of the specimen 60 in accordance with the spatial frequency.

By detecting the information of the specimen 60 through the above-mentioned method, the calculation section 20 is able to automatically set the illumination shape appropriate for the observation of the specimen. However, various modifications can be further applied to the examples.

For example, in the microscope system 200 shown in FIG. 11, by using two image sensors at the same time, it is possible to simultaneously acquire two information pieces of the image of the imaging plane and the image of the pupil 273. However, by inserting a detachable relay lens between the pupil 273 and the image sensor 80 and forming an image conjugate to the pupil 273 on the image sensor 80, it is possible to acquire the spatial frequency information of the specimen 60 even when using only a single image sensor.

Furthermore, the microscope system 200 may be configured such that an interferometer is built in the microscope system 200 and the interference image of the pupil is acquired. With such a configuration, by checking out the amplitude information of the pupil, it is also possible to acquire the phase information of the specimen 60. The interferometer can cause the object light, which is transmitted through the specimen 60, and the reference light, which is not transmitted through the specimen 60, to interfere with each other, measure the interference image through the second image sensor 280, and obtain Fourier spectrum of the object, thus it is possible to acquire the phase information of the object. In the case of forming the interferometer, it is preferable that a laser or the like be used in the illumination light source 30. By using the laser, it is possible to obtain strong monochromatic light, and thus it is possible to further reduce the size of the point light source. Furthermore, from the plurality of illumination directions, the interference image between the diffracted light of the object light and the reference light is detected by the image sensor 80, whereby it is also possible to form three-dimensional picture of the specimen 60. A detailed description of the microscope using the interferometer is disclosed in, for example, WO 2008/123408.

Furthermore, the point light sources shown in FIG. 10B may be formed by using a mask having point openings instead of the first spatial light modulation element 90.

Furthermore, a larger number of the point light sources shown in FIG. 10B are formed along the outer peripheral portion of the circle 31. Thereby, it is possible to obtain the spatial frequency or the diffracted light in a case where the inclined illuminations from more directions are applied to the specimen 60. Furthermore, the plurality of point light sources shown in FIG. 10B may be measured at a plurality of single wavelengths, for example, the respective wavelengths of red, blue, and green. When the respective point light sources shown in FIG. 10B are measured at red, blue, and green, a description will be given with reference to FIG. 13C.

Figure 13C:
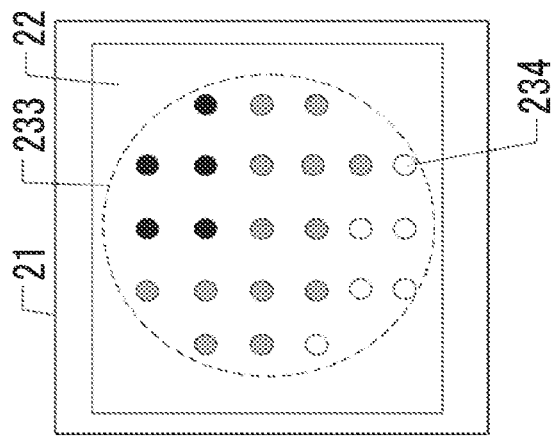
FIG. 13C is a diagram of the display section 21 which displays a picture of an image of the pupil 273 in each wavelength of red, blue, and green detected by the second image sensor 280 in a case where the specimen 60 is a biological object.

FIG. 13C is a diagram of the display section 21 which displays a picture of an image of the pupil 273 in each wavelength of red, blue, and green detected by the second image sensor 280 in a case where the specimen 60 is a biological object. FIG. 13C is a diagram in the case where the specimen 60 is measured by using the respective wavelengths of red, blue, and green through, for example, the point light source 32b of FIG. 10B. In actual measurement, the images of the pupil 273 formed by all the point light sources 32a to 32e are measured. In FIG. 13C, the image 234a which is detected at the wavelength of red, the image 234b which is detected at the wavelength of blue, and the image 234c which is detected at the wavelength of green are displayed on the same screen. Since the spatial frequency is inversely proportional to the wavelength, by measuring the image of the specimen 60 in the pupil 273 for each wavelength of light, it is possible to further accurately examine the spatial frequency distribution of the specimen 60. In FIG. 13C, existence of the structure, in which the region of the picture 234a detected at the wavelength of red has a relatively small spatial frequency and the region of the picture 234b detected at the wavelength of blue has a relatively large spatial frequency, is estimated.

Second Example

In the first example, the microscope system 100 having the bright field microscope was described, and in the second example, a microscope system 300 having the phase-contrast microscope will be described.

<Microscope System 300>

Figure 14B:
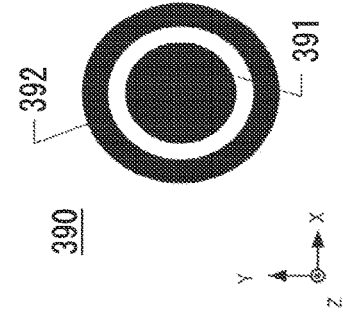
FIG. 14B is a top plan view of a first spatial light modulation element 390.
Figure 14C:
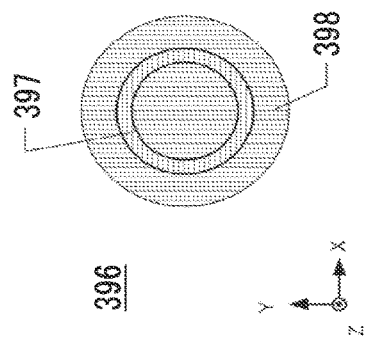
FIG. 14C is a top plan view of a second spatial light modulation element 396.
Figure 14A:
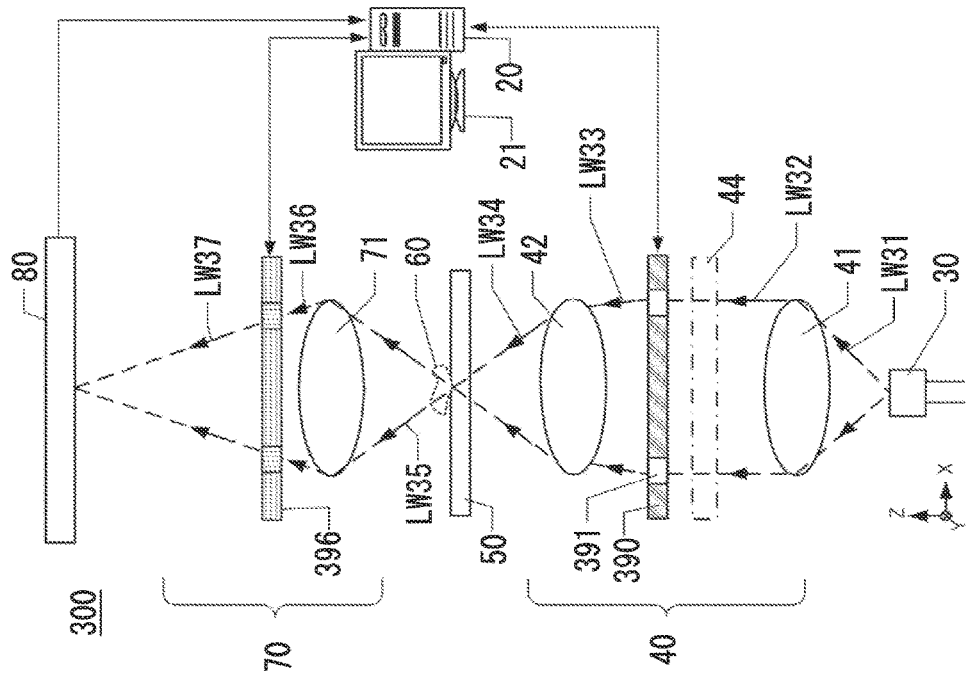
FIG. 14A is a schematic configuration diagram of a microscope system 300.

FIG. 14A is a schematic configuration diagram of the microscope system 300. The microscope system 300 is an optical microscope system for observing the specimen 60. The microscope system 300 mainly includes: the illumination light source 30; the illumination optical system 40; the imaging optical system 70; the image sensor 80; and the calculation section 20. Furthermore, the illumination optical system 40 includes: a first condenser lens; the wavelength filter 44; a first spatial light modulation element 390; and the second condenser lens 42. The imaging optical system 70 includes the objective lens 71 and a second spatial light modulation element 396. Furthermore, the stage 50 is disposed between the illumination optical system 40 and the imaging optical system 70, and the specimen 60 is placed on the stage 50.

The second spatial light modulation element 396 is disposed at a position of the pupil of the imaging optical system 70 or in the vicinity thereof. Furthermore, the first spatial light modulation element 390 is disposed at the position conjugate to the pupil of the imaging optical system 70 in the illumination optical system 40. The first spatial light modulation element 390 is an element which is able to arbitrarily change the intensity distribution of the transmitted light, and is constituted by a liquid crystal panel, a DMD, or the like. The second spatial light modulation element 396 is constituted by such a liquid crystal panel which is an element capable of changing the phase. Furthermore, it is preferable that the second spatial light modulation element be configured to freely change the phase and the light intensity distribution.

In FIG. 14A, the light, which is emitted from the illumination light source 30, is indicated by the dotted line. The illumination light LW31, which is emitted from the illumination light source 30, is converted into the light LW32 through the first condenser lens 41. The light LW32 is incident to the first spatial light modulation element 390. The light LW33, which is transmitted through the first spatial light modulation element 390, is transmitted through the second condenser lens 42, is converted into the light LW34, and propagates toward the specimen 60. The light LW35, which is transmitted through the specimen 60, is transmitted through the objective lens 71, is converted into the light LW36, and is incident to the second spatial light modulation element 396. The light LW36 is transmitted through the second spatial light modulation element 396, is converted into the light LW37, and forms an image on the image sensor 80. The output data of the picture formed on the image sensor 80 is sent to the calculation section 20. The calculation section 20 calculates the illumination shape, which is most appropriate to the specimen 60, on the basis of the output data of the picture obtained from the image sensor 80, the shape data of the transmission region (the illumination region) 391 formed by the first spatial light modulation element 390, and the shape data of the second spatial light modulation element 396. Then, the shape, which is appropriate for the observation of the specimen 60 subjected to the calculation, is transmitted to the first spatial light modulation element 390 and the second spatial light modulation element 396. In addition, when the wavelength filter 44 is provided, only light with a specific wavelength is transmitted through the wavelength filter 44, and is incident to the first spatial light modulation element 390.

FIG. 14B is a top plan view of the first spatial light modulation element 390. In the first spatial light modulation element 390, the light transmission region (the illumination region) 391 is formed in a ring shape, and a region other than the transmission region 391 is formed as a light blocking region 392.

FIG. 14C is a top plan view of the second spatial light modulation element 396. Since a phase modulation region 397 is formed in a ring shape in the second spatial light modulation element 396, the phase of the light, which is transmitted through the phase modulation region 397, is shifted by ¼ wavelength. The phase of the light, which is transmitted through the diffracted light transmission region 398 as a region other than the phase modulation region 397, is unchanged. The phase modulation region 397 is formed to be conjugate to the transmission region 391 of the first spatial light modulation element 390.

The 0-order light (the transmitted light) of the microscope system 300 is transmitted through the first spatial light modulation element 390, is transmitted through the phase modulation region 397 of the second spatial light modulation element 396, and reaches the image sensor 80. Furthermore, the diffracted light, which is emitted from the specimen 60, is transmitted through the diffracted-light transmission region 398 of the second spatial light modulation element 396, and reaches the image sensor 80. Then, the 0-order light and the diffracted light form an image on the image sensor 80. Generally, the 0-order light has an intensity stronger than that of the diffracted light, and thus it is preferable to form a filter for adjusting the intensity of the light of the phase modulation region 397. This filter can be formed by adding an optical element which is capable of freely changing the spatial distribution of the transmittance, or the like to the second spatial light modulation element 396, wherein the optical element has an array of cells and can be electrically controlled (for example, PCT Japanese Translation Patent Publication No. 2010-507119).

The first spatial light modulation element 390 and the second spatial light modulation element 396 are able to freely change the sizes and the shapes of the transmission region 391 and phase modulation region 397. For example, when the diameter of the transmission region 391 of the first spatial light modulation element 390 increases, the numerical aperture of the transmitted light increases, and thus it is possible to increase the resolution. Furthermore, by using the method of deriving the illumination shape shown in the first example, the shape of the transmission region 391 of the first spatial light modulation element 390 may be optimized. The ring-shaped region 397 of the second spatial light modulation element 396 is always formed to be conjugate to the transmission region 391 of the first spatial light modulation element 390. Hence, it is preferable that the shapes of the transmission region 391 and the ring-shaped region 397 be synchronously changed.

The best modes for carrying out the invention have hitherto been described, but it will be readily apparent to those skilled in the art that various modifications can be applied to the examples without departing from the technical scope of the invention.

What is claimed is:

1. A microscope system comprising:
   an illumination light source that illuminates illumination light to a specimen;
   an imaging optical system that forms an image of transmitted light or reflected light from the specimen;

an illumination optical system that has a first spatial light modulation element, which changes an intensity distribution of the illumination light at a conjugate position of a pupil of the imaging optical system, and illuminates light, which is originated from the illumination light source, on the specimen;

an image sensor that detects light through the imaging optical system;

a setting portion that sets a parameter of an observation condition of a region setting or a wavelength band setting regarding an observed image of the specimen; and a calculation section that compares output data detected by the image sensor after the intensity distribution of the illumination light has been changed and output data detected by the image sensor before the intensity distribution of the illumination light has been changed for each change of the intensity distribution of the illumination light by the first spatial light modulation element, and that successively calculates the intensity distribution of the illumination light appropriate for the parameter of the observation condition set by the setting portion.

2. The microscope system according to claim 1, wherein the setting portion sets a parameter of the observation condition of spatial frequency band setting.

3. The microscope system according to claim 1, wherein the calculation section calculates optimum intensity distribution of the illumination light through a genetic algorithm, which uses output data of first and second pictures as initial data, by a process including changing the intensity distribution of the illumination light so as to form first and second intensity distributions of the illumination light and acquiring the output data of the first and second pictures corresponding thereto.

4. The microscope system according to claim 3, wherein the intensity distribution of the illumination light is changed in accordance with the intensity distribution of the illumination light generated by at least one genetic algorithm for each generation of the genetic algorithm, the output data of the picture corresponding thereto is acquired, and the data is used in a subsequent calculation of the genetic algorithm.

5. The microscope system according to claim 1, wherein the calculation section calculates a spatial frequency or a contrast of the specimen based on the output data detected by the image sensor and sets an observational region of the specimen based on the contrast or the spatial frequency.

6. The microscope system according to claim 1, wherein the first spatial light modulation element is able to serve as a monochromatic point light source, wherein the image sensor is disposed on an imaging plane of the imaging optical system, and detects the output data of the picture of the specimen under an illumination condition of the monochromatic point light source, and wherein the calculation section calculates the intensity distribution of the illumination light appropriate for observation of the specimen from the illumination condition and the output data of the picture.

7. The microscope system according to claim 1, further comprising a second spatial light modulation element that is disposed at a position of the pupil of the imaging optical system or in a vicinity of the conjugate position of the pupil of the imaging optical system and at a position conjugate to the first spatial light modulation element, wherein the second spatial light modulation element is able to change spatial distribution of an additional phase applied to the transmitted light.

* * * * *